(12) United States Patent
Saji

(10) Patent No.: US 8,031,496 B2
(45) Date of Patent: Oct. 4, 2011

(54) DRIVING CIRCUIT FOR POWER SWITCHING DEVICE, DRIVING METHOD THEREOF, AND SWITCHING POWER SUPPLY APPARATUS

(75) Inventor: Takashi Saji, Shiga (JP)

(73) Assignee: Panasonic Corporation, Osaka (JP)

( * ) Notice: Subject to any disclaimer, the term of this patent is extended or adjusted under 35 U.S.C. 154(b) by 492 days.

(21) Appl. No.: 12/265,217

(22) Filed: Nov. 5, 2008

(65) Prior Publication Data

US 2009/0116265 A1    May 7, 2009

(30) Foreign Application Priority Data

Nov. 7, 2007  (JP) .................................. 2007-289501
Oct. 7, 2008  (JP) .................................. 2008-260973

(51) Int. Cl.
 *H02M 7/68*    (2006.01)
(52) U.S. Cl. ...................................... 363/97; 363/21.16
(58) Field of Classification Search .............. 363/16–17, 363/20, 21.07, 21.08, 21.17, 97–98, 89; 323/222, 323/282, 288, 290; 361/42, 46, 62, 292
See application file for complete search history.

(56) References Cited

U.S. PATENT DOCUMENTS

| | | | |
|---|---|---|---|
| 6,023,178 A * | 2/2000 | Shioya et al. ................. | 327/176 |
| 6,169,680 B1 * | 1/2001 | Matsui et al. .............. | 363/21.05 |
| 6,515,876 B2 * | 2/2003 | Koike et al. ................. | 363/21.16 |
| 6,577,511 B2 * | 6/2003 | Yamaguchi et al. ........ | 363/21.07 |
| 6,972,970 B2 * | 12/2005 | Yamada ...................... | 363/21.16 |
| 7,035,119 B2 | 4/2006 | Koike | |
| 7,315,160 B2 * | 1/2008 | Fosler ........................... | 323/285 |
| 2003/0095422 A1 | 5/2003 | Nagaki et al. | |
| 2004/0070577 A1 | 4/2004 | Kigo et al. | |
| 2004/0125095 A1 | 7/2004 | Kigo et al. | |
| 2007/0083865 A1 | 4/2007 | Hemmi | |
| 2007/0090482 A1 | 4/2007 | Kaneko et al. | |

FOREIGN PATENT DOCUMENTS

JP   2007-115871   5/2007

OTHER PUBLICATIONS

English language Abstract of JP 2007-115871, May 10, 2007.

* cited by examiner

*Primary Examiner* — Rajnikant Patel

(74) *Attorney, Agent, or Firm* — Greenblum & Bernstein, P.L.C.

(57) ABSTRACT

A driving circuit includes a generation unit configured to generate a driving signal for turning on and off a power switching device, the driving signal having plural levels of voltage at which the power switching device is turned on. The driving circuit also includes a switching control unit configured to switch between the plural levels of voltage at which the power switching device is turned on, depending on a status of the power switching device.

14 Claims, 19 Drawing Sheets

DRIVING CIRCUIT FOR POWER SWITCHING DEVICE, DRIVING METHOD THEREOF, AND SWITCHING POWER SUPPLY APPARATUS

BACKGROUND OF THE INVENTION (1) Field of the Invention

The present invention relates to a driving circuit which outputs a driving signal to a power switching device in a switching power supply apparatus.

(2) Description of the Related Art

In recent years, from the point of view of anti-global warming measures, standby power reduction in home electric appliances has drawn attention, and switching power supply apparatuses which consume less power on standby has been in strong demand.

FIG. 19 is a diagram illustrating an example of a configuration of a switching power supply apparatus 200. The switching power supply apparatus 200 controls on and off of a voltage control type switching device 25 to output a stable direct current voltage. Specifically, the switching power supply apparatus 200 includes a primary side rectifying and smoothing circuit 101, a switching circuit 102, a transformer 103, a secondary side rectifying and smoothing circuit 104, and a feedback circuit 119.

The primary side rectifying and smoothing circuit 101 includes a diode bridge 109 and an input capacitor 110. In the primary side rectifying and smoothing circuit 101, the diode bridge 109 full-wave rectifies a voltage and the input capacitor 110 smoothes the full-wave rectified voltage.

The switching circuit 102 causes the voltage control type switching device 25 to switch at high speed, and outputs an alternating current having a high frequency to the transformer 103. Specifically, the switching circuit 102 includes a driving circuit 108, an external resistor 121 of the driving circuit 108, a resonant capacitor 122, and the voltage control type switching device 25. The voltage control type switching device 25 is a power switching device such as a metal-oxide-semiconductor field-effect transistor (MOSFET).

A primary winding 111 is provided in the transformer 103. The primary winding 111 and the voltage control type switching device 25 are connected in series, and an input direct current voltage is supplied to the series circuit.

A gate terminal of the voltage control type switching device 25 is connected to the driving circuit 108, and conduction and cutoff of the voltage control type switching device 25 are controlled by a driving signal provided by the driving circuit 108.

Furthermore, a secondary winding 112 magnetically coupled with the primary winding 111 and an auxiliary winding 120 magnetically coupled with the primary and secondary windings 111 and 112 are provided in the transformer 103. When a switching operation of the voltage control type switching device 25 causes a current to flow intermittently through the primary winding 111, a voltage is induced in the secondary winding 112 and the auxiliary winding 120.

The secondary side rectifying and smoothing circuit 104 rectifies and smoothes the voltage induced in the secondary winding 112 to generate an output direct current voltage, and outputs the voltage from output terminals 117 and 118. Here, the secondary side rectifying and smoothing circuit 104 includes a rectifying diode 113, a choke coil 114, a first output capacitor 115, and a second output capacitor 116. The choke coil 114, the first output capacitor 115, and the second output capacitor 116 are connected in π-type. The voltage induced in the secondary winding 112 is half-wave rectified by the rectifying diode 113, and the half-wave rectified voltage is smoothed by the choke coil 114 and the first and second capacitors 115 and 116.

The voltage induced at both ends of the auxiliary winding 120 is inputted to a control terminal of the voltage control type switching device 25 via the driving circuit 108. The switching power supply apparatus 200 employs a Ringing Choke Converter (RCC) method. The voltage control type switching device 25 self-excites with the voltage induced in the auxiliary winding 120 to perform the switching operation.

The driving circuit 108 uses the voltage induced in the auxiliary winding 120 to generate an auxiliary direct current voltage inside. The driving circuit 108, except when first starting up, operates on the auxiliary direct current voltage.

It is to be noted that when first starting up, that is, when an alternating current voltage is supplied between input terminals 105 and 106, because the voltage control type switching device 25 does not perform the switching operation, no voltage is induced in the auxiliary winding 120 and the driving circuit 108 has no power supply. Accordingly, in order to cause the voltage control type switching device 25 to start the switching operation, the primary side rectifying and smoothing circuit 101 supplies, via the external resistor 121 (high voltage, high power) of the driving circuit 108, a low voltage sufficient to activate the driving circuit 108.

Moreover, a voltage value or a current value between the output terminals 117 and 118 is fed back to the driving circuit 108 via the feedback circuit 119. For instance, in the case where the voltage between the output terminals 117 and 118 decreases, the driving circuit 108 forcibly extends a conduction period of the voltage control type switching device 25. Conversely, in the case where the voltage between the output terminals 117 and 118 rises, the driving circuit 108 forcibly shortens a conduction period of the voltage control type switching device 25 and performs control so that the voltage between the output terminals 117 and 118 is maintained at a certain value.

Here, in the case where a load connected between the output terminals 117 and 118 is heavy, in the above-mentioned switching power supply apparatus 200 employing the RCC method, the conduction period of the voltage control type switching device 25 is extended, and a large current flowing through the primary winding 111 causes the voltage between the output terminals 117 and 118 to be maintained at the certain value. Conversely, in case of a light load such as a standby state, the conduction period of the voltage control type switching device 25 is shortened, and a decrease in a current flowing through the primary winding 111 causes the voltage between the output terminals 117 and 118 to be maintained at the certain value. It is to be noted that in the RCC method, a switching frequency increases with the shortening of the conduction period of the voltage control type switching device 25.

FIG. 20 is a timing diagram illustrating, in different load states, a power supply output current Io and a power supply output voltage Vo of the conventional switching power supply apparatus 200, and a drain current Ids and a gate voltage Vgs of the voltage control type switching device 25. As stated above, the drain current Ids of the voltage control type switching device 25 varies depending on the load connected between the output terminals 117 and 118. Hereafter, in the present Specification, the drain current Ids flowing through the voltage control type switching device 25 is defined as a load current.

A rated load state is, for example, a state in which a television is on, and a state in which the largest amount of current flows within a normal operational range. Furthermore, a standby state is, for instance, a state of light load in which the television is off and a remote control operation is on standby, and a state in which a load is light. A load change state is a state in a transition period from the rated load state to the standby state.

In the rated load state, because a large amount of the power supply output current Io, which is the current outputted by the switching power supply apparatus 200, flows, the power supply output voltage Vo, which is the voltage between the output terminals 117 and 118, is low. When the power supply output voltage Vo is low, the driving circuit 108 widens a pulse width of the gate voltage Vgs of the voltage control type switching device 25 to increase the drain current Ids flowing through the voltage control type switching device 25.

Next, in the load change state, because the load is gradually reduced, the power supply output current Io decreases, and accordingly the power supply output voltage Vo increases. When the power supply output voltage Vo increases, the driving circuit 108 gradually narrows the pulse width of the gate voltage Vgs to suppress the drain current Ids.

In the standby state, the power supply output current Io further decreases, and the power supply output voltage Vo increases. When the power supply output voltage Vo is high, the pulse width of the gate voltage Vgs is further narrowed, and the drain current Ids is further suppressed.

In the above-mentioned switching power supply apparatus 200, a power loss occurs mainly in the voltage control type switching device 25. The MOSFET is usually used for the voltage control type switching device 25. Generally, although a bipolar transistor causes a large switching loss when switching from a conduction state to a cutoff state, the MOSFET having a fast switching speed causes a small switching loss. On the other hand, unlike the bipolar transistor, the MOSFET having large conduction resistance causes a considerable conduction loss. Thus, when a large current flows, the conduction loss increases. Accordingly, a gate voltage of the MOSFET is set high to lower the conduction resistance, so that the conduction loss is reduced.

Moreover, a device which has been proposed in recent years switches between the following two operation modes. In one operation mode, the device operates as a MOSFET favorable to a high frequency and a low current in case of a light load such as a standby mode; and, in the other operation mode, the device operates as an insulated gate bipolar transistor (IGBT) favorable to a low frequency and a large current in case of a heavy load (for 10 example, see Patent Reference 1: Japanese Unexamined Patent Application Publication No. 2007-115871). Because, when the large current flows, the device operates as the IGBT to further lower the conduction resistance, it is possible to comprehensively reduce both the switching and conduction losses caused in a case ranging from the light load to the heavy load.

SUMMARY OF THE INVENTION

In the above-mentioned switching power supply apparatus 200, however, the driving circuit 108 also causes a considerable loss. The loss caused by the driving circuit 108 includes a driving loss caused in driving the voltage control type switching device 25. The driving loss is calculated with the following equation. Here, P is a power loss [W], Qg an amount of gate charge necessary for driving a voltage control type switching device [C], Vgs a gate voltage [V], and f a drive frequency [Hz].

$$P = Qg \times Vgs \times f \quad \text{(Equation 1)}$$

Equation 1 indicates that a loss (power consumption, heating value) caused by a driving circuit increases with the larger the amount of gate charge Qg, the output gate voltage Vgs, and the drive frequency f. In addition, because the amount of gate charge Qg increases with the higher gate voltage Vgs, the loss caused by the driving circuit 108 is said to largely depend on the gate voltage Vgs.

In other words, driving a MOSFET at a high gate voltage decreases a loss caused by the MOSFET on the one hand, but at the same time increases the loss caused by the driving circuit 108. Especially, because a frequency becomes high in the switching power supply apparatus 200 employing the RCC method in case of a light load, it becomes difficult to reduce power consumption of the switching power supply apparatus 200 at a time when the switching power supply apparatus 200 is standby.

It is to be noted that because even a recently proposed device which combines MOSFET and IGBT operations is driven at a high gate voltage to make full use of a current capability in the IGBT operation, it is difficult to reduce power consumption at a time of standby likewise. The current capability is the maximum current value of a device at a gate voltage.

Furthermore, driving the voltage control type switching device 25 at a high gate voltage may cause the voltage control type switching device 25 to break down at the occurrence of abnormality such as a short load. The following describes the reason why the voltage control type switching device 25 breaks down. The driving at the high gate voltage increases the current capability of the voltage control type switching device 25, and the short load and the like cause a large current to flow right after the voltage control type switching device 25 is turned on. In many switching power supply apparatuses, however, right after the voltage control type switching device 25 is turned on, a blanking period in which an overcurrent protection function is disabled within a predetermined time is set aside so as to prevent false detection of overcurrent protection. Accordingly, the large current flows until the overcurrent protection function operates, and surge voltages and noise occurring when the voltage control type switching device 25 is turned off may cause device breakdown and false operation of other electronic devices. Especially, in a switching device such as the IGBT, a large current may cause a parasitic thyristor to operate, and a latchup may lead to the breakdown because the switching device cannot be turned off.

The objective of the present invention is to minimize losses in an entire switching power supply apparatus including a driving loss caused by a driving circuit and a conduction loss caused by a voltage control type switching device. In addition, the other objective of the present invention is to prevent a power switching device from breaking down due to abnormality such as a short load.

In order to achieve the above objective, a driving circuit according to the present invention is a driving circuit which drives a power switching device in a switching power supply apparatus and includes: a generation unit configured to generate a driving signal for turning on and off the power switching device, the driving signal having plural levels of voltage at which the power switching device is turned on; and a switching control unit configured to switch between the plural levels of voltage at which the power switching device is turned on, depending on a status of the power switching device.

Accordingly, switching between the plural levels of voltage at which the power switching device is turned on suppresses driving and conduction losses.

Furthermore, the switching control unit may switch between the plural levels of voltage so that voltage increases with a higher load current flowing through the power switching device.

As a result, when the load current is small, the driving loss can be reduced. Moreover, when the load current is large, the conduction loss can be reduced.

Moreover, the plural levels of voltage may include a first voltage and a second voltage that is lower than the first voltage; the generation unit may include a first driver which generates the first voltage and a second driver which generates the second voltage; and the switching control unit may control the first and second drivers so that the second driver generates, as the driving signal for turning on the power switching device, a pulse having the second voltage, when the load current is equal to or smaller than a first threshold, and to control the first and second drivers so that the first driver generates, as the driving signal for turning on the power switching device, a pulse having the first voltage, when the load current is larger than the first threshold.

Consequently, when the load current is equal to or smaller than the threshold, the driving loss can be reduced. Moreover, when the load current is larger than the threshold, the conduction loss can be reduced.

Moreover, the generation unit may further include a current limiting unit configured to limit a power supply current supplied to at least one of the first driver and the second driver.

Accordingly, rising an edge of at least one of the pulse having the first voltage generated by the first driver and the pulse having the second voltage generated by the second driver becomes mildly-sloped. Thus, because a high-frequency component can be reduced, noise occurred in the driving circuit can be suppressed.

Furthermore, the driving circuit may include: an overcurrent protection circuit which detects whether or not the load current exceeds a second threshold that is larger than the first threshold and indicates an overcurrent reference, and suspends the driving circuit when the overcurrent protection circuit has detected that the load current exceeds the second threshold; and a disable circuit which disables the first driver for a time period corresponding to a time period from when an overcurrent is detected until when the power switching device is suspended.

As a result, the power switching device avoids breaking down due to latchup caused when the overcurrent occurs.

Moreover, the switching control unit may generate a first control pulse signal for enabling an output of the first driver when the load current is larger than the first threshold; the second driver may generate the pulse having the second voltage according to a second control pulse signal indicating a time period in which the power switching device is turned on and a time period in which the power switching device is turned off; and the disable circuit may include a delay circuit which delays the second control pulse signal by a predetermined time, and a gate circuit which outputs, to the first driver, a logical AND between the delayed second control pulse signal and the first control pulse signal.

Consequently, because only the second voltage generated by the second driver is outputted and the first voltage generated by the first driver is not outputted in a predetermined time period, a large current that flows at occurrence of abnormality such as a load short can be limited. That is to say, the breakdown of the power switching device at the occurrence of abnormality can be prevented. In particular, a power switching device having a parasitic thyristor structure such as an IGBT prevents the latchup, thereby avoiding the breakdown in an effective manner.

Furthermore, the switching control unit may control the second driver so that the second driver generates, as the driving signal for turning on the power switching device, the pulse having the second voltage, when the load current is equal to or smaller than the first threshold, and to control the first and second drivers so that the first driver generates, as the driving signal for turning on the power switching device, a two-step pulse which rises to the second voltage and further to the first voltage, when the load current is larger than the first threshold.

Accordingly, because a voltage of the driving signal is always the second voltage right after the first rise of the two-step pulse occurs, in comparison to the case in which a voltage rises to the first voltage in one step when the driving signal is on, noise generation at a time when the driving signal is switched from off to on can be reduced. Furthermore, in the case where the load current is measured at the primary side, it is possible to perform more practical control such as detecting that the load current which gradually increases after the power switching device is turned on exceeds the threshold and switching the voltage of the driving signal.

Moreover, the switching control unit may generate a first control pulse signal for enabling an output of the first driver when the load current is larger than the first threshold; the first driver may include a first transistor having a source to which the first voltage is applied and a gate to which a pulse signal of a logical AND between the first control pulse signal and a second control pulse signal is applied; the second driver includes a second transistor having a source to which the second voltage is applied and a gate to which the second control pulse signal indicating a time period in which the power switching device is turned on and a time period in which the power switching device is turned off; the generation unit may further include: a reverse-flow prevention diode which prevents reverse flow of a current, the reverse-flow prevention diode being connected between a drain of the first transistor and a drain of the second transistor; and a third transistor which turns on and off the power switching device in a complementary manner with the second transistor; and the drain of the first transistor, a cathode of the reverse-flow prevention diode, and a drain of the third transistor are connected to each other.

As a result, the driving circuit can be simply configured using the transistor.

Furthermore, a driving method according to the present invention is a driving method for driving a power switching device in a switching power supply apparatus, the driving method includes: comparing a load current flowing through the power switching device and a threshold; outputting, as an ON signal, a pulse having a first voltage at which the power switching device is turned on to the power switching device, when the load current is larger than the threshold; and outputting, as an ON signal, a pulse having a second voltage that is lower than the first voltage and at which the power switching device is turned on to the power switching device, when the load current is equal to or smaller than the threshold.

Moreover, a switching power supply apparatus according to the present invention is a switching power supply apparatus which includes: a diode bridge which rectifies an inputted alternating current signal; a power switching device which switches rectified voltage; a driving circuit which drives the power switching device; a transformer which transforms voltage generated by driving the power switching device into different voltage; and a rectifying and smoothing circuit which rectifies and smoothes the transformed voltage and outputs the rectified and smoothed voltage, wherein the driving circuit includes: a generation unit configured to generate a driving signal for turning on and off the power switching device, the driving signal having plural levels of voltage at which the power switching device is turned on; and a switching control unit configured to switch between the plural levels of voltage at which the power switching device is turned on, depending on a status of the power switching device.

Furthermore, the switching device may be a unipolar transistor.

The conduction resistance of the unipolar transistor has a feature of depending more on a gate voltage with a higher load current flowing through the unipolar transistor. That is to say, when the load current is small at the light load, the conduction resistance of the unipolar transistor does not increase with the smaller gate voltage. Thus, because the voltage of the driving signal is switched based on the load current flowing through the unipolar transistor, the conduction and driving losses can be suppressed.

Moreover, the switching device may be a transistor having a function to switch between a unipolar operation and a bipolar operation according to a load current flowing through the switching device.

Consequently, the conduction loss can be reduced by performing a bipolar operation and driving the power switching device at a high gate voltage when a large current flows, and the driving loss can be reduced by performing a unipolar operation and driving the switching device at a low gate voltage at the light load. Thus, the main losses in the switching power supply apparatus such as the switching, conduction, and driving losses can be reduced in a case ranging from the light load to the heavy load.

Furthermore, the switching power supply apparatus may further include: a measuring unit configured to measure a current outputted from the rectifying and smoothing circuit; and a conversion unit configured to convert the measured current into a load current flowing through the power switching device, wherein the switching control unit is configured to switch between the plural levels of voltage at which the power switching device is turned on, according to the converted load current.

The driving circuit according to the present invention can minimize the losses in the entire switching power supply apparatus including the driving loss caused by the driving circuit and the conduction loss caused by the voltage control type switching device. In addition, the driving circuit can prevent the power switching device from breaking down at the time of startup or at the occurrence of abnormality such as the short load.

FURTHER INFORMATION ABOUT TECHNICAL BACKGROUND TO THIS APPLICATION

The disclosure of Japanese Patent Application No. 2007-289501 filed on Nov. 7, 2007 and Japanese Patent Application No. 2008-260973 filed on Oct. 7, 2008 including specifications, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the accompanying drawings.

DESCRIPTION OF THE PREFERRED EMBODIMENT(S)

The following will describe each embodiment of the present invention with reference to the drawings.

Embodiment 1

A driving circuit according to an embodiment 1 is a driving circuit which drives a power switching device in a switching power supply apparatus, and includes: a generation unit configured to generate a driving signal for turning on and off the power switching device, the driving signal having plural levels of voltage at which the power switching device is turned on; and a switching control unit configured to switch between the plural levels of voltage at which the power switching device is turned on, depending on a status of the power switching device.

Figure 1:
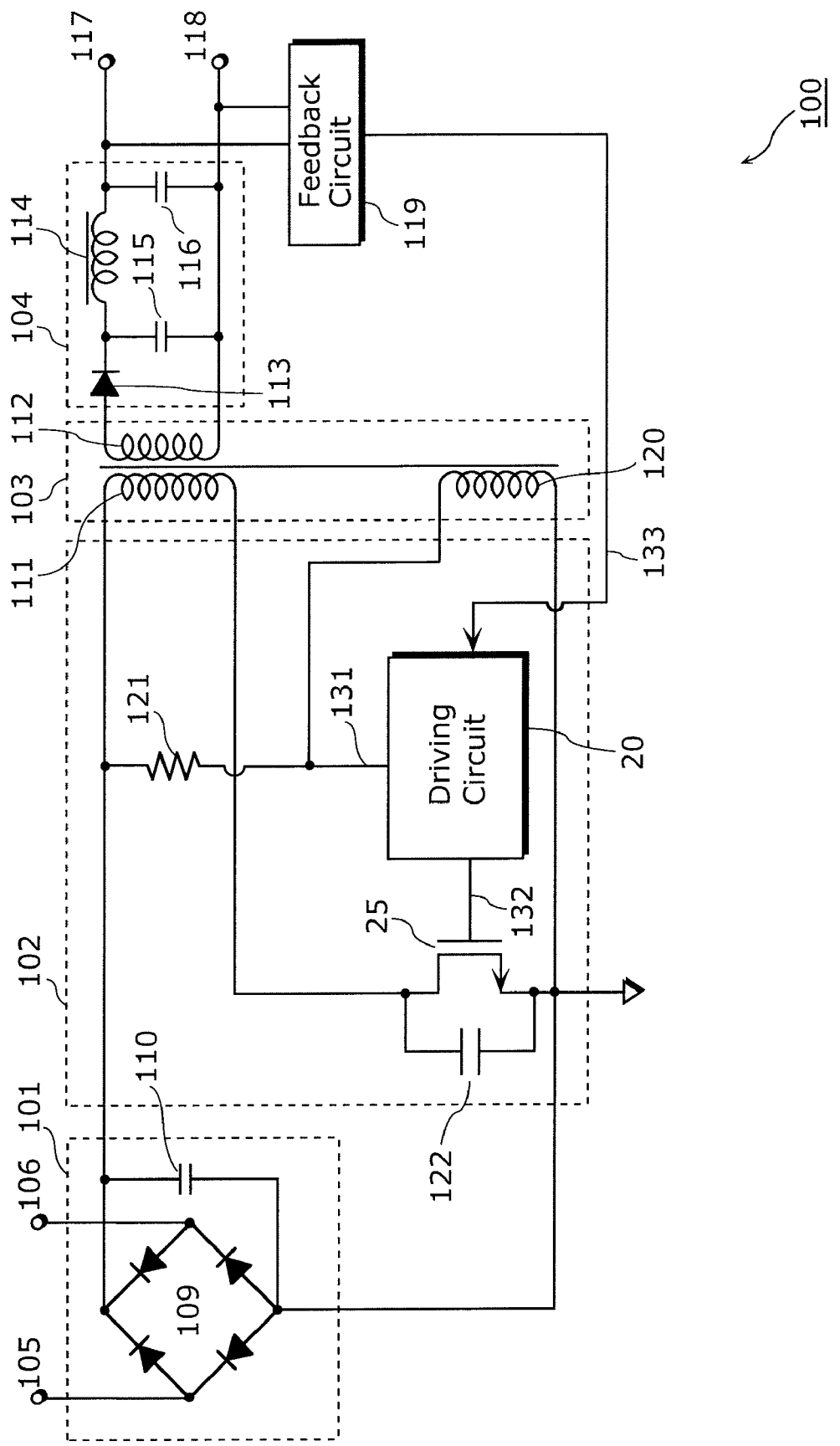
FIG. 1 is a diagram illustrating a configuration of a switching power supply apparatus including a driving circuit according to an embodiment 1.

FIG. 1 is a diagram illustrating a configuration of a switching power supply apparatus 100 including a driving circuit 20 according to the embodiment 1.

The switching power supply apparatus 100 according to employs a RCC method, and includes a primary side rectifying and smoothing circuit 101, a switching circuit 102, a transformer 103, a secondary side rectifying and smoothing circuit 104, and a feedback circuit 119.

The primary side rectifying and smoothing circuit 101 includes a diode bridge 109 and an input capacitor 110. In the primary side rectifying and smoothing circuit 101, the diode bridge 109 rectifies an inputted alternating current signal, and the input capacitor 110 smoothes the rectified alternating current signal. The primary side rectifying and smoothing circuit 101 then outputs the smoothed alternating current signal to the switching circuit 102.

The switching circuit 102 causes a voltage control type switching device 25 to switch at high speed, and outputs an alternating current having a high frequency to the transformer 103. Specifically, the switching circuit 102 includes the driving circuit 20, an external resistor 121 of the driving circuit 20, a resonant capacitor 122, and the voltage control type switching device 25.

When the switching power supply apparatus 100 starts up, power is supplied via the external resistor 121 to the driving circuit 20. Next, the driving circuit 20 applies a voltage to a gate of the voltage control type switching device 25 to cause the voltage control type switching device 25 to perform a switching operation. It is to be noted that except when the switching power supply apparatus 100 starts up, the driving circuit 20 operates with power supplied from an auxiliary winding 120 included in the transformer 103.

The driving circuit 20 includes the generation unit and the switching control unit. The switching control unit is configured to switch between the plural levels of voltage so that the voltage rises with the increase in the load current flowing through the power switching device. The plural levels of voltage include a first voltage and a second voltage that is lower than the first voltage. The generation unit includes a first driver which generates the first voltage and a second driver which generates the second voltage. The switching control unit is configured to control the first and second drivers so that the second driver generates, as the driving signal for turning on the power switching device, a pulse having the second voltage, when the load current is equal to or smaller than a first threshold, and to control the first and second drivers so that either the first driver or the first and second drivers generate, as the driving signal for turning on the power switching device, a pulse having the first voltage, when the load current is larger than the first threshold.

The transformer 103 transmits energy from a primary side to a secondary side. Specifically, the transformer 103 includes a primary winding 111, a secondary winding 112, and an auxiliary winding 120. When the voltage control type switching device 25 is turned on, the energy accumulated in the primary winding 111 is transmitted to the secondary winding 112. Subsequently, when a secondary-side current flowing through the secondary winding 112 gradually decreases to zero, a resonant operation is started which is determined by inductance of the primary winding 111 included in the transformer 103 and capacitance of the resonant capacitor 122 placed between a drain and a source of the voltage control type switching device 25. The driving circuit 20 detects the above-mentioned resonant operation, and applies a next driving signal 132 to the voltage control type switching device 25.

The alternating current signal generated by the above-mentioned switching operation is transmitted via the secondary winding 112 of the transformer 103 to the secondary side rectifying and smoothing circuit 104.

The secondary side rectifying and smoothing circuit 104 includes a rectifying diode 113, a choke coil 114, a first output capacitor 115, and a second output capacitor 116. In the secondary side rectifying and smoothing circuit 104, the rectifying diode 113 rectifies the alternating current signal transmitted to the secondary winding 112, and the choke coil 114 and the first and second output capacitors 115 and 116 smooth the rectified alternating current signal. The secondary side rectifying and smoothing circuit 104 then outputs the smoothed alternating current signal as an output of the switching power supply apparatus 100.

The feedback circuit 119 feeds back a feedback signal 133 to the driving circuit 20 so that a current value outputted by the secondary side rectifying and smoothing circuit 104, that is, an output voltage is kept constant which varies depending on the power supply output current Io of the switching power supply apparatus 100. For instance, the driving circuit 20 controls the load current flowing through the voltage control type switching device 25 depending on a status of the secondary side to which the feedback signal 133 indicating a current value is fed back. The feedback circuit 119 includes, for instance, a photocoupler, and feeds back the feedback signal 133 via the photocoupler.

Figure 2:
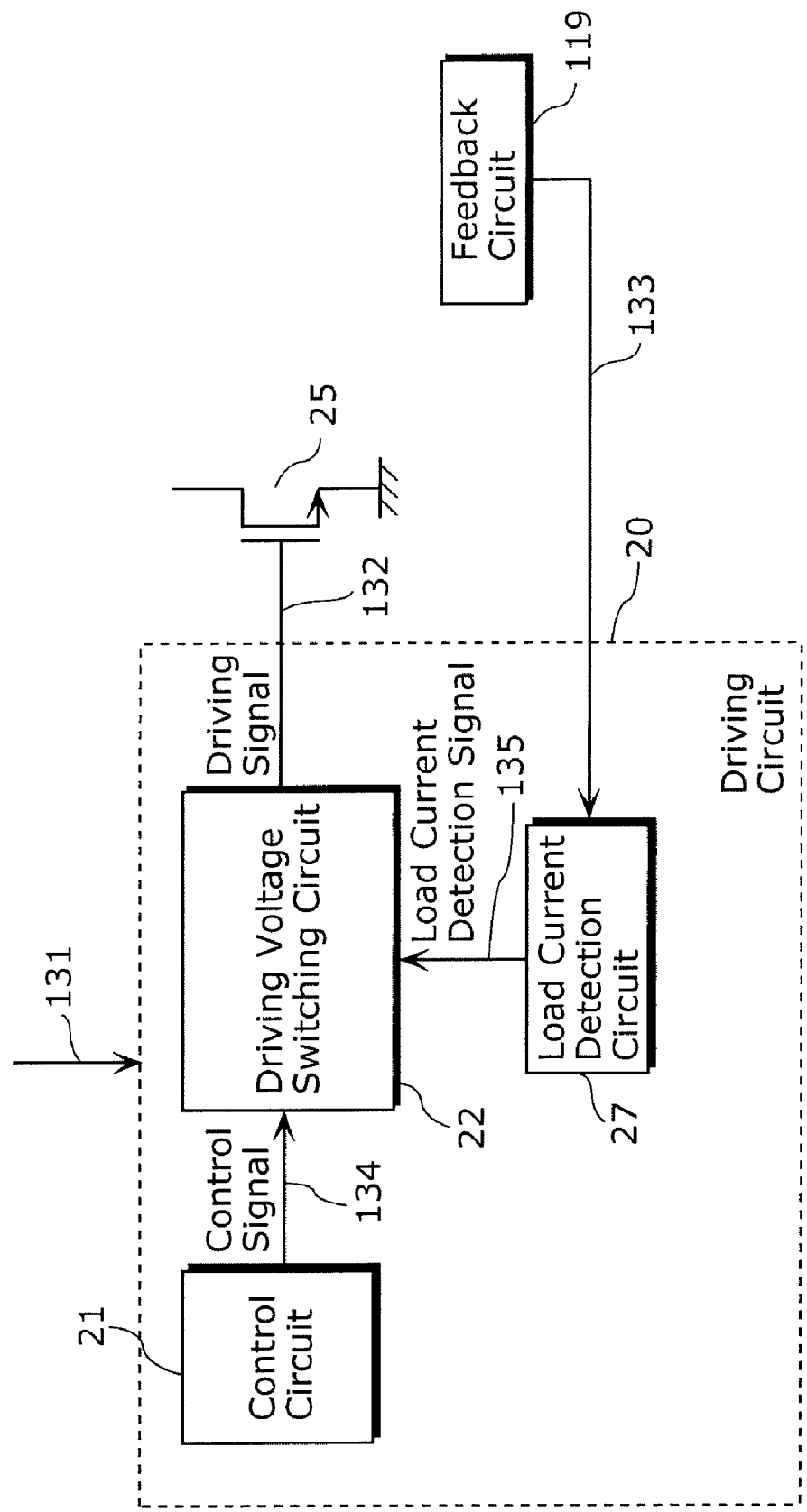
FIG. 2 is a diagram illustrating a configuration of the driving circuit, a voltage control type switching device, and a feedback circuit according to the embodiment 1.

FIG. 2 is a diagram illustrating a configuration of the driving circuit 20, the voltage control type switching device 25, and the feedback circuit 119 according to the embodiment 1. The driving circuit 20 in the figure is a circuit which generates the driving signal 132 that is a signal for driving the voltage control type switching device 25, and outputs the generated driving signal 132. The driving signal 132 is a signal for turning on and off the voltage control type switching device 25. The driving circuit 20 includes a control circuit 21, a load current detection circuit 27, and a driving voltage switching circuit 22.

The control circuit 21 outputs, to the driving voltage switching circuit 22, a control signal 134 that is a signal indicating a period in which the voltage control type switching device 25 is turned on and a period in which the voltage control type switching device 25 is turned off. Specifically, the control circuit 21 detects the resonant operation determined by the inductance of the primary winding 111 included in the transformer 103 and the capacitance of the resonant capacitor 122, and turns on the control signal 134. In addition, the control circuit 21 turns off the control signal 134, in the case where any one of the following cases occurs: a case where the load current flowing through the voltage control type switching device 25 reaches a current value determined by the feedback signal 133; a case where turn-on time of the voltage control type switching device 25 reaches the maximum turn-on time set by the control circuit 21; and a case where a current flowing through the voltage control type switching device 25 reaches a predetermined overcurrent protection reference voltage VLIMIT. The overcurrent protection reference voltage VLIMIT is, for instance, specified by the characteristics of the voltage control type switching device 25.

It is to be noted that though not specifically illustrated, the feedback signal 133 is inputted to the control circuit 21, and the control circuit 21 has a function to adjust the load current flowing through the voltage control type switching device 25 according to the inputted feedback signal 133.

The load current detection circuit 27 includes, for instance, a comparator, judges whether or not the load current determined by the feedback signal 133 exceeds a predetermined threshold, and outputs, to the driving voltage switching circuit 22, a load current detection signal 135 indicating whether or not the load current exceeds the predetermined threshold. When it is judged that the load current exceeds the predetermined threshold, the load current detection circuit 27, for example, sets the load current detection signal 135 high. When it is judged that the load current does not exceed the predetermined threshold, the load current detection circuit 27, for example, sets the load current detection signal 135 low.

The driving voltage switching circuit 22 generates the driving signal 132 having plural levels of voltage at which the voltage control type switching device 25 is turned on, and applies the driving signal 132 to the gate of the voltage control type switching device 25, the driving signal 132 being a signal for turning on and off the voltage control type switching device 25. Specifically, when the control signal 134 indicates a period in which the voltage control type switching device 25 is turned on, the driving voltage switching circuit 22 applies, to the gate of the voltage control type switching device 25, the driving signal 132 for turning on the voltage control type switching device 25. The voltage of the driving signal 132 is switched according to the load current detection signal 135 outputted by the load current detection circuit 27.

Next, the detailed configuration of the driving voltage switching circuit 22 will be described.

Figure 3:
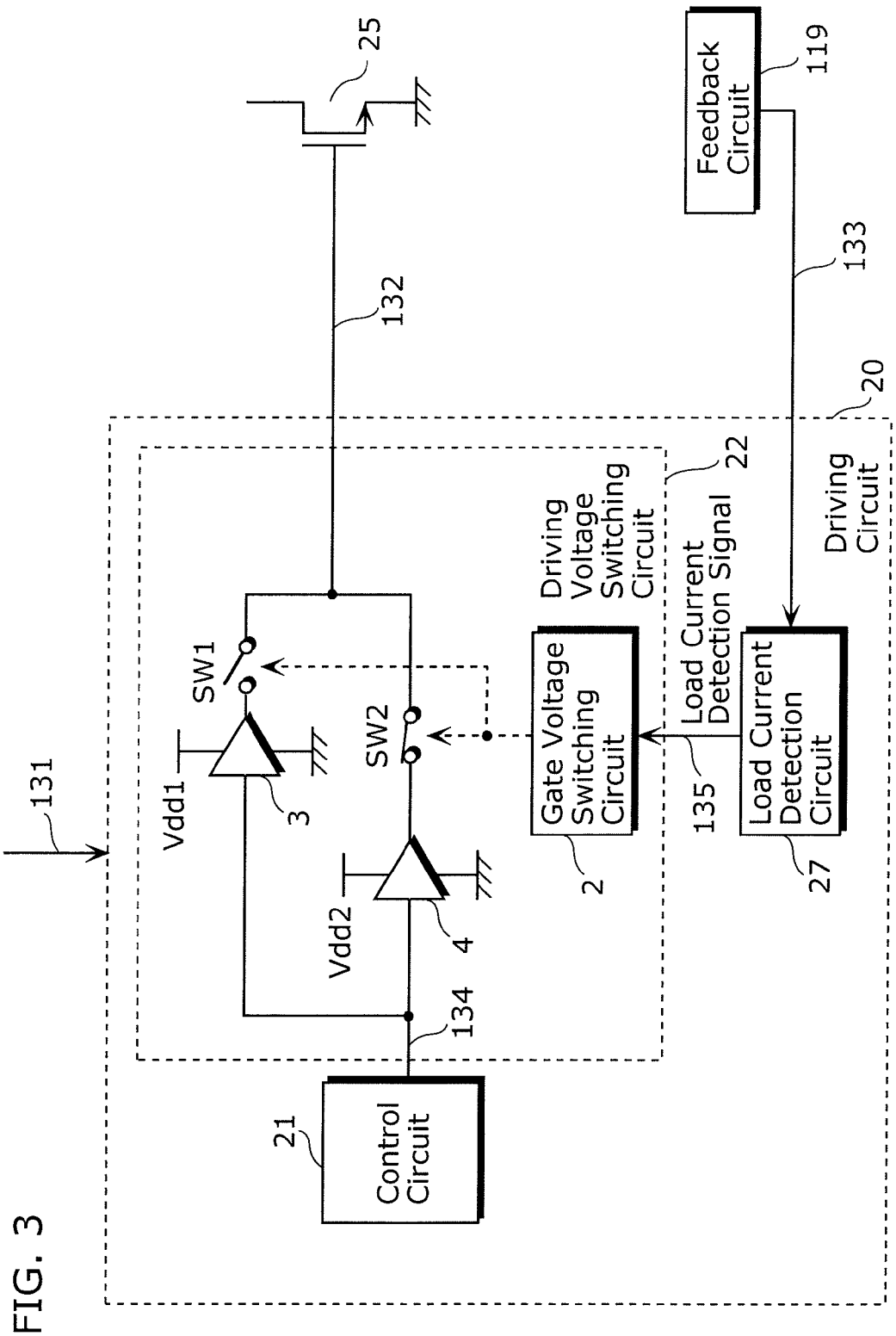
FIG. 3 is a block diagram illustrating in detail the configuration shown in FIG. 2.

FIG. 3 is a block diagram illustrating in detail the configuration shown in FIG. 2.

The driving voltage switching circuit 22 includes a gate voltage switching circuit 2, a high voltage driver 3, a low voltage driver 4, a first switch SW1, and a second switch SW2. Here, the high voltage driver 3 and the low voltage driver 4 function as the generation unit configured to generate the driving signal having the plural levels of voltage at which the voltage control type switching device 25 is turned on. In addition, the gate voltage switching circuit 2, the first switch SW1, and the second switch SW2 function as the switching control unit configured to switch the plural levels of voltage at which the voltage control type switching device 25 is turned on, depending on the status of the voltage control type switching device 25. As for a specific configuration, a circuit in which the first switch SW 1 is series-connected to the subsequent stage of the high voltage driver 3 and a circuit in which the second switch SW2 is series-connected to the subsequent stage of the low voltage driver 4 are parallel-connected.

The gate voltage switching circuit 2 turns on one of the first switch SW1 and the second switch SW2, and turns off the other one, according to the load current detection signal 135. For instance, when the load current detection signal 135 is set high, the gate voltage switching circuit 2 turns on the first switch SW1, and turns off the second switch SW2. Moreover, when the load current detection signal 135 is set low, the gate voltage switching circuit 2 turns off the first switch SW1, and turns on the second switch SW2. Accordingly, the driving voltage switching circuit 22 applies, to the voltage control type switching device 25, a voltage generated by the high voltage driver 3 or a voltage generated by the low voltage driver 4. Here, a power supply voltage of the high voltage driver 3 is Vdd1, and a power supply voltage of the low voltage driver 4 is Vdd2 (Vdd1>Vdd2).

As stated above, the plural levels of voltage include the Vdd1 and the Vdd2 that is lower than the Vdd1. The generation unit includes the high voltage driver 3 which generates the Vdd1 and the low voltage driver 4 which generates the Vdd2. The switching control unit is configured to control the high voltage driver 3 and the low voltage driver 4 so that the low voltage driver 4 generates, as the driving signal 132 for turning on the voltage control type switching device 25, a pulse having the Vdd2, when the load current flowing through the voltage control type switching device 25 is equal to or smaller than a predetermined threshold Idsth, and to control the high voltage driver 3 and the low voltage driver 4 so that the high voltage driver 3 generate's as the driving signal 132 for turning on the voltage control type switching device 25, a pulse having the Vdd1, when the load current is larger than the threshold Idsth. Accordingly, when the load current is equal to or smaller than the threshold Idsth, the driving loss can be reduced. Moreover, when the load current is larger than the threshold Idsth, the conduction loss can be reduced.

Figure 4:
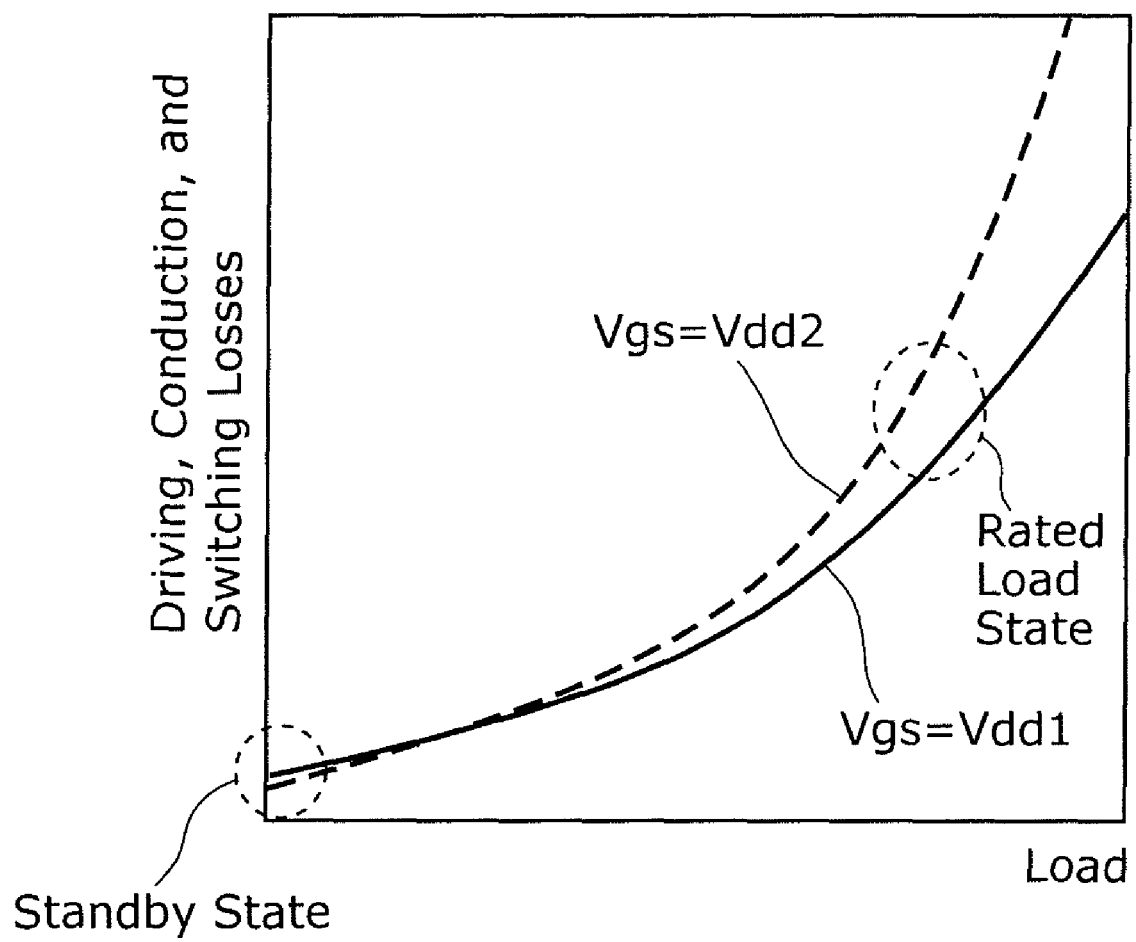
FIG. 4 is a diagram illustrating a relationship between a load connected to the switching power supply apparatus and a sum of main losses such as driving, conduction, and switching losses.
Figure 5:
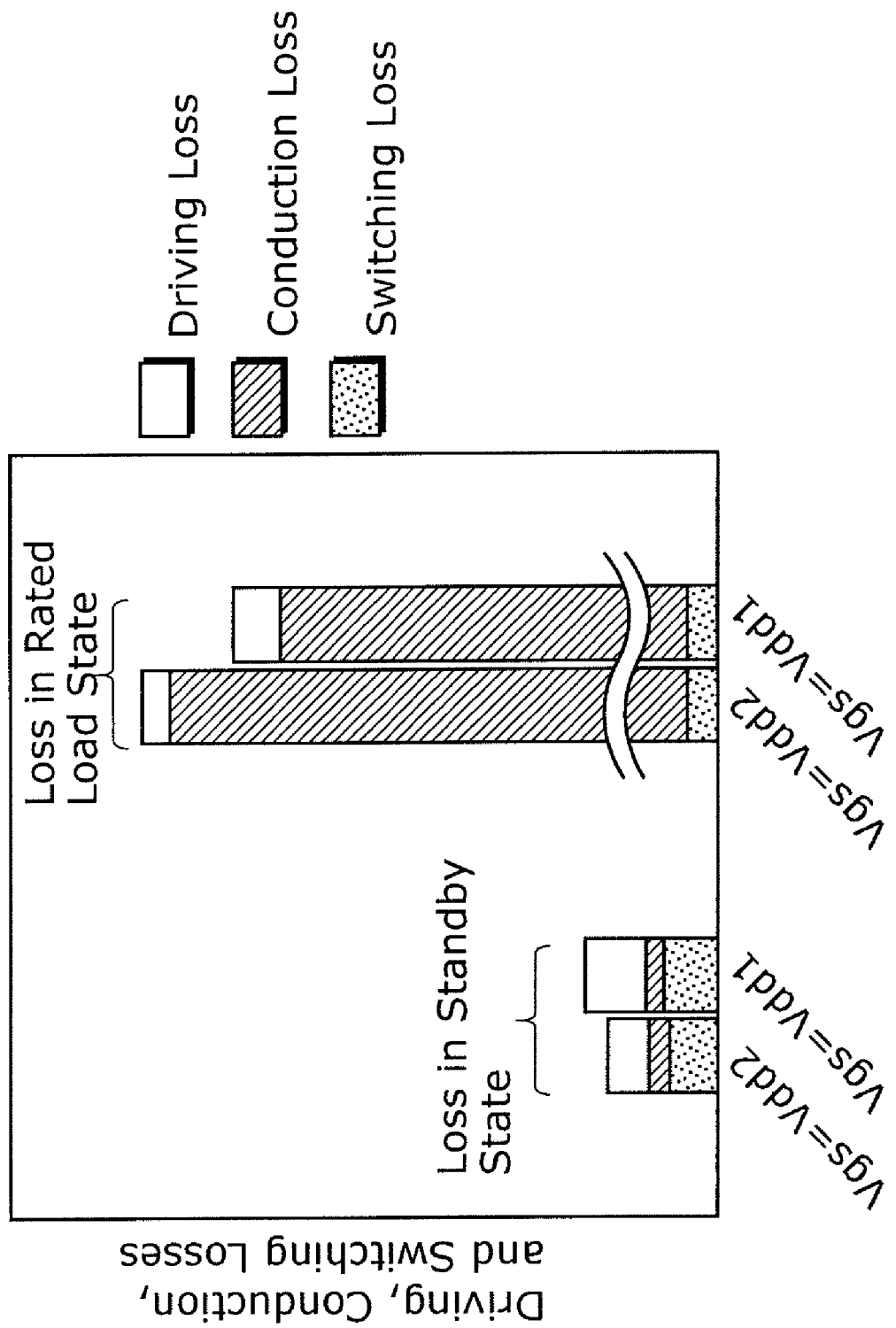
FIG. 5 is a diagram illustrating an amount of each loss in a standby state and a rated load state as shown in FIG. 4.

FIG. 4 is a diagram illustrating a relationship between a load connected to the switching power supply apparatus 100 and a sum (hereafter, referred to as an overall loss) of main losses such as driving, conduction, and switching losses. FIG. 5 is a diagram illustrating an amount of each loss in a standby state and a rated load state as shown in FIG. 4. Here, each of the driving, conduction, and switching losses will be described.

The driving loss is the loss indicated by Equation 1, indicates a power loss caused by the consumption of power by a gate capacitor of the voltage control type switching device 25, and largely depends on a gate voltage and a switching frequency. Accordingly, in the case where, at the same gate voltage, a driving loss in the standby state is compared to a driving loss in the rated load state, the driving loss is large in the standby state in which the switching frequency is high. Under the same condition, in the case where different gate voltages are compared, a driving loss is large at the Vdd1 having a high gate voltage level.

The conduction loss indicates a power loss in a time period in which the voltage control type switching device 25 is conductive, and largely depends on conduction resistance, the power loss being expressed by a product of a flowing current and the conduction resistance. Here, conduction resistance occurring in a power MOSFET will be described in the case where the voltage control type switching device 25 is the power MOSFET.

Figure 6:
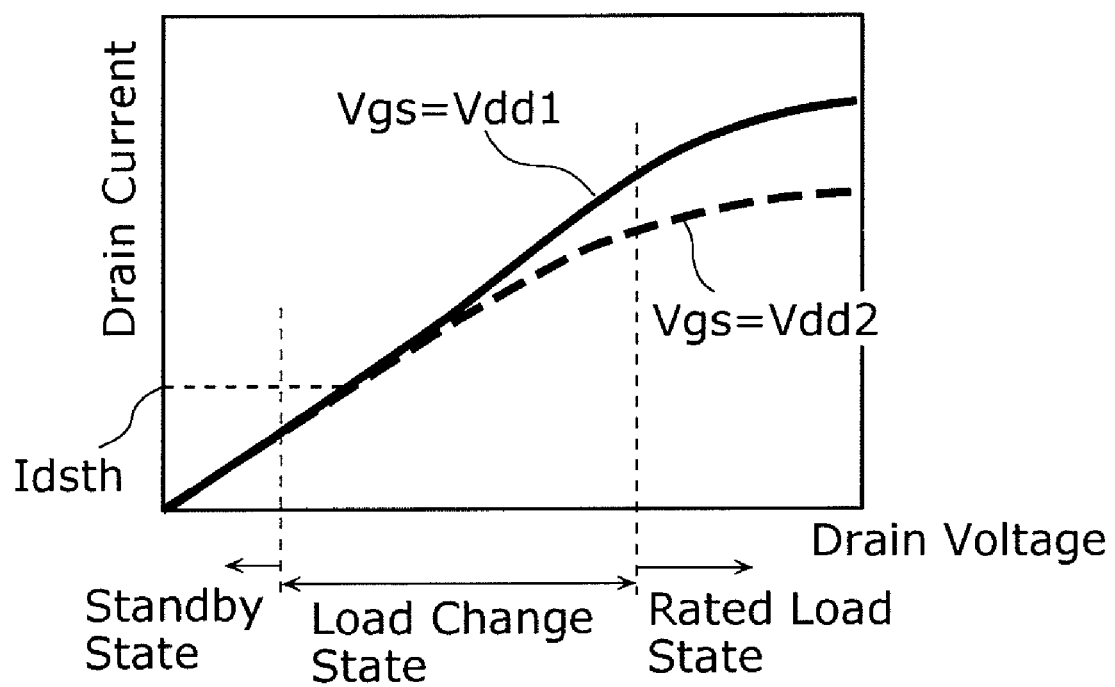
FIG. 6 is a diagram illustrating V-I characteristics of a power MOSFET.

FIG. 6 is a diagram illustrating V-I characteristics of the power MOSFET.

The figure illustrates the V-I characteristics when a gate voltage Vgs has two different voltage levels, Vdd1 and Vdd2. Idsth is a drain current value at which gate voltage dependence of the power MOSFET begins to increase.

As is obvious from the figure, a current capability of the power MOSFET increases with the rise in the gate voltage Vgs. Thus, setting the gate voltage Vgs high suppresses the conduction resistance to reduce the conduction loss. In a region where a drain current Ids is small, however, because the conduction resistance does not largely depend on the gate voltage Vgs, the conduction loss caused by the gate voltage Vgs having the Vdd1 is equal to the conduction loss caused by the gate voltage Vgs having the Vdd2.

The switching loss is a power loss which occurs at a moment when the voltage control type switching device 25 is turned on or off. Thus, a loss is large in the standby state in which the switching frequency is high.

As stated above, the conduction loss is in a trade-off relationship with the driving loss and the switching loss. However, the proportion of the conduction loss in the rated load state is dominant, and reducing the conduction loss leads to the reduction of the overall loss.

In response, a threshold of the load current detected by the load current detection circuit 27 is set to the Idsth. The load current detection circuit 27 judges whether or not the drain current Ids is larger than the threshold Idsth. In the case where the drain current Ids is judged to be larger than the threshold Idsth, the load current detection signal 135 is set high. In the case where the drain current Ids is judged to be equal to or smaller than the threshold Idsth, the load current detection signal 135 is set low. For example, in the case where the load current detection circuit 27 includes the comparator and the like, compares a reference value and the load current, and outputs the load current detection signal 135, the load current detection circuit 27 reads the drain current value at which the gate voltage dependence begins to increase, based on the V-I characteristics of the voltage control type switching device 25, and sets the drain current value to the threshold Idsth.

It is to be noted that the gate voltage dependence here denotes that the gate voltage varies the conduction resistance (=drain voltage/drain current) of the voltage control type switching device 25, and that a state in which the gate voltage dependence begins to increase is that when the drain current is increased, the channel resistance of the voltage control type switching device 25 becomes considerable, and a difference in the conduction resistance between the two levels of gate voltage. Although it has been described that the drain current value at which the gate voltage dependence of the power MOSFET begins to increase is set as the threshold of the comparator included in the load current detection circuit 27, in consideration of the respective proportions of the driving loss and the conduction loss, a predetermined value which is the difference in the conduction resistance between the two levels of gate voltage, for instance, a load current value at which conduction resistance at a high gate voltage is lower than conduction resistance at a low gate voltage by 5% may be set as the threshold of the comparator included in the load current detection circuit 27.

For this reason, even when the gate voltage is reduced at the light load, the driving loss of the driving circuit can be reduced without increasing the conduction loss. On the other hand, because the conduction loss can be reduced by setting the gate voltage high at the heavy load, the losses in the entire switching power supply apparatus including the driving loss caused by the driving circuit and the conduction loss caused by the voltage control type switching device can be minimized in a case ranging from the light load to the heavy load.

As mentioned above, reduction in the overall loss in the case ranging from the light load to the heavy load can be realized by switching the gate voltage of the voltage control type switching device 25 depending on a load. In particular, a very light load, that is, the reduction in the overall loss can significantly contribute to the standby power reduction of home electronic appliances.

Next, the operation of the switching power supply apparatus 100 including the above-mentioned driving circuit 20 will be described.

Figure 7:
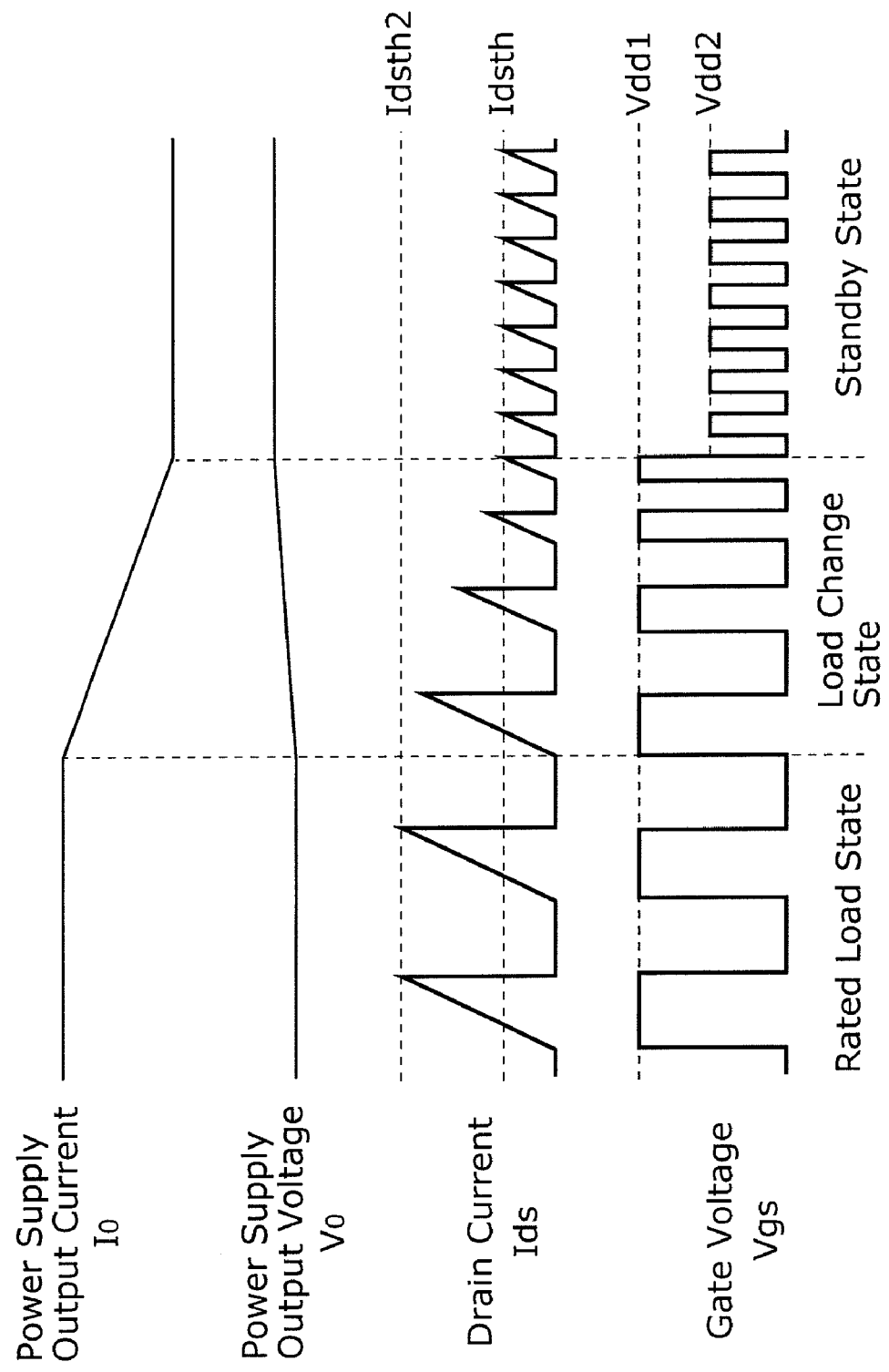
FIG. 7 is a timing diagram illustrating, in different load states, a power supply output current and a power supply output voltage of the switching power supply apparatus, and a drain current and a gate voltage of the voltage control type switching device according to the embodiment 1.

FIG. 7 is a timing diagram illustrating, in different load states, a power supply output current Io and a power supply output voltage Vo of the switching power supply apparatus 100 and a drain current Ids and a gate voltage Vgs of the voltage control type switching device 25 according to the embodiment 1.

In the rated load state, a large amount of the power supply output current Io, which is a current outputted by the switching power supply apparatus 100, flows. At this time, based on the feedback signal 133, the load current detection circuit 27 judges whether or not a peak current of the drain current Ids flowing through the voltage control type switching device 25 is larger than threshold Idsth. When the peak current is judged to be larger than the threshold Idsth, the load current detection circuit 27 outputs, for instance, the load current detection signal 135 that is set high.

When the load current detection signal 135 is set high, the gate voltage switching circuit 2 turns on the first switch SW1 connected to the high voltage driver 3, and turns off the second switch SW2. Accordingly, the driving circuit 20 outputs, as the driving signal 132, a pulse signal of the Vdd1 having the high gate voltage level.

Next, in the load change state which is a period of transition from the rated load state to the standby state, because the load is gradually lightened, the power supply output current Io decreases, and accordingly the power supply output voltage Vo increases. When the power supply output voltage Vo increases, the driving circuit 21 gradually narrows the pulse width of the control signal 134 to vary the pulse width of the driving signal 132 in the same manner and to suppress the drain current Ids. Furthermore, because the peak current of the drain current Ids is larger than the threshold Idsth, the gate voltage switching circuit 2 keeps conducting the first switch SW1. Accordingly, the driving circuit 20 outputs, as the driving signal 132, the pulse signal of the Vdd1 having the high gate voltage level.

In the standby state, the power supply output current Io further decreases, and the power supply output voltage Vo increases. When the power supply output voltage Vo is high, the control circuit 21 further narrows the pulse width of the control signal 134 to further suppress the peak current of the drain current Ids. In the case where the drain current Ids is judged to be equal to or smaller than the threshold Idsth, the load current detection circuit 27 outputs, for instance, the load current detection signal 135 that is set low. In the case where the load current detection signal 135 is set low, the gate voltage switching circuit 2 turns off the first switch SW1, and turns on the second switch SW2. Accordingly, the driving circuit 20 outputs, as the driving signal 132, a pulse signal of the Vdd2 having the high gate voltage level.

As stated above, the driving circuit 20 according to the embodiment 1 generates, as the driving signal 132 for turning on the voltage control type switching device 25, the pulse having the Vdd2, when the load current flowing through the voltage control type switching device 25 is equal to or smaller than the predetermined threshold; and generates, as the driving signal 132 for turning on the voltage control type switching device 25, a pulse having the Vdd1 which is higher in voltage than the Vdd2, when the load current is larger than the predetermined threshold.

Thus, the driving circuit 20 according to the embodiment can reduce the driving loss when the load current is equal to or smaller than the predetermined threshold. In addition, the driving circuit 20 according to the embodiment 1 can reduce the conduction loss when the load current is larger than the predetermined threshold.

It is to be noted that although the case where the power MOSFET as shown in FIG. 6 is connected, as the voltage control type switching device 25, to the driving circuit 20 has been described in the embodiment 1, the present invention is not limited to this. For example, in stead of the power MOSFET, a device which combines a MOSFET for a unipolar operation and an IGBT for a bipolar operation may be connected, as the voltage control type switching device 25, to the driving circuit 20.

Figure 8:
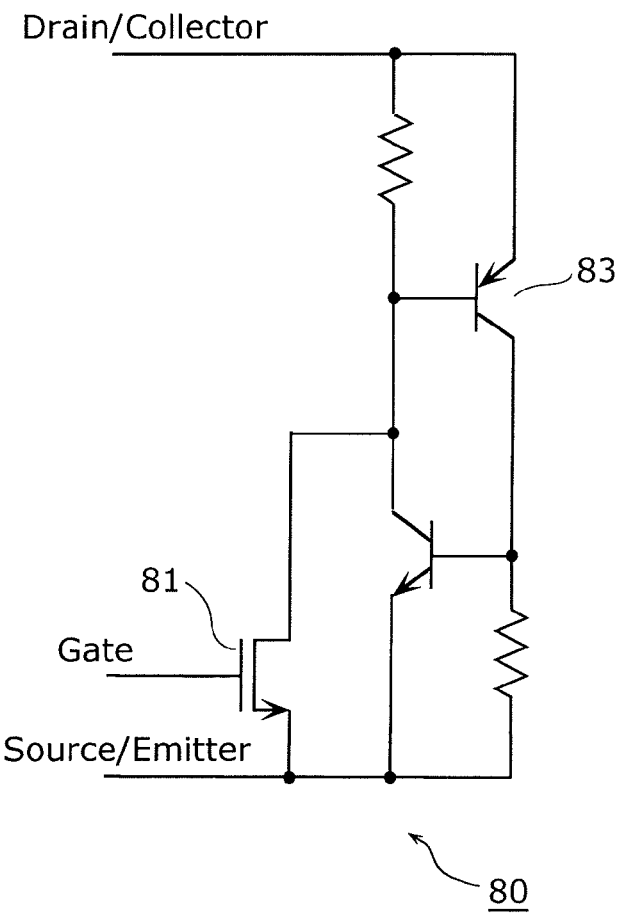
FIG. 8 is a circuit diagram illustrating an equivalent circuit included in a device which combines a MOSFET and an IGBT.

FIG. 8 is a circuit diagram illustrating an equivalent circuit included in a device which is described in the Patent Reference 1 and combines a MOSFET and an IGBT. An equivalent circuit 80 is a circuit which has a function to switch between a unipolar operation and a bipolar operation.

Figure 9:
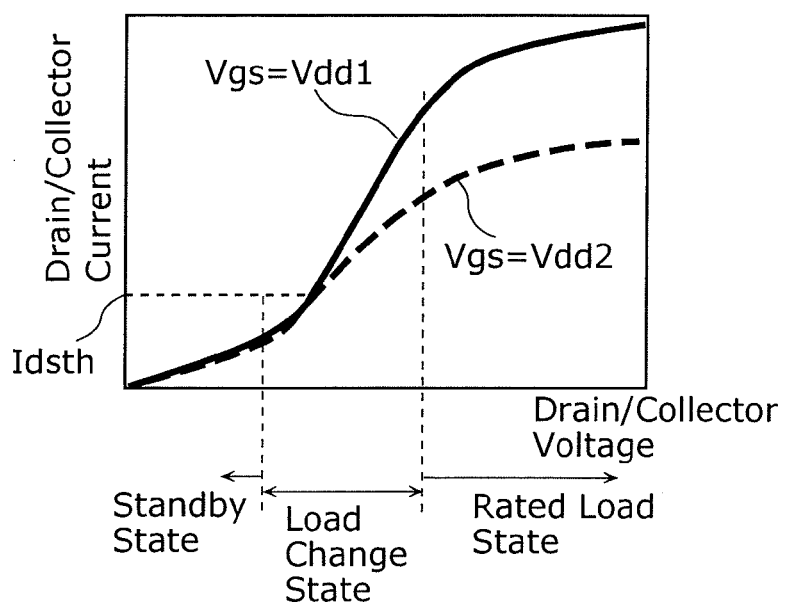
FIG. 9 is a diagram illustrating V-I characteristics of the device which combines the MOSFET and the IGBT.

FIG. 9 is a diagram illustrating V-I characteristics of the device which combines the MOSFET and the IGBT.

The device which combines the MOSFET and the IGBT operates a unipolar transistor 81 that swiftly performs a switching operation in a standby state where an amount of load current is small, and operates a bipolar transistor 83 that allows a large current to flow in a rated load state where an amount of load current is large. In comparison with the V-I characteristics of the commonly-used power MOSFET shown in FIG. 6, because conduction resistance in the rated load state can be reduced more, a conduction loss can be reduced. In this case, a threshold which the load current detection circuit 27 uses as a reference of comparison is set to, for example, a drain current at which a MOSFET operation is switched to an IGBT operation.

Moreover, the embodiment 1 is not limited to FIG. 2. Although the driving circuit which switches between the two gate voltages has been described in the embodiment 1, the driving circuit may switch between more than two gate voltages.

Figure 10:
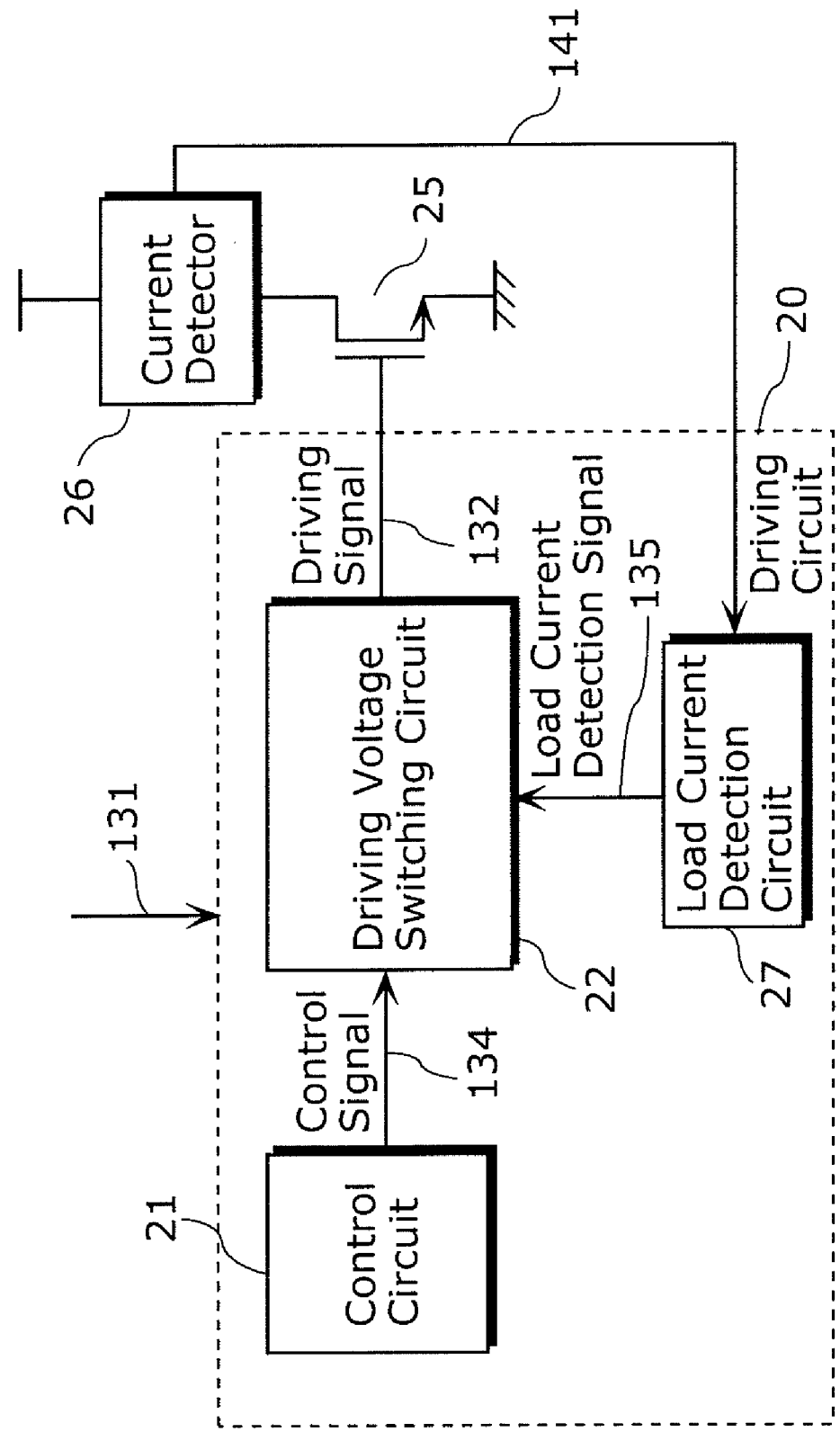
FIG. 10 is a diagram illustrating in detail the configuration which is shown in FIG. 2 and in which a current detector is included instead of the feedback circuit.
Figure 11:
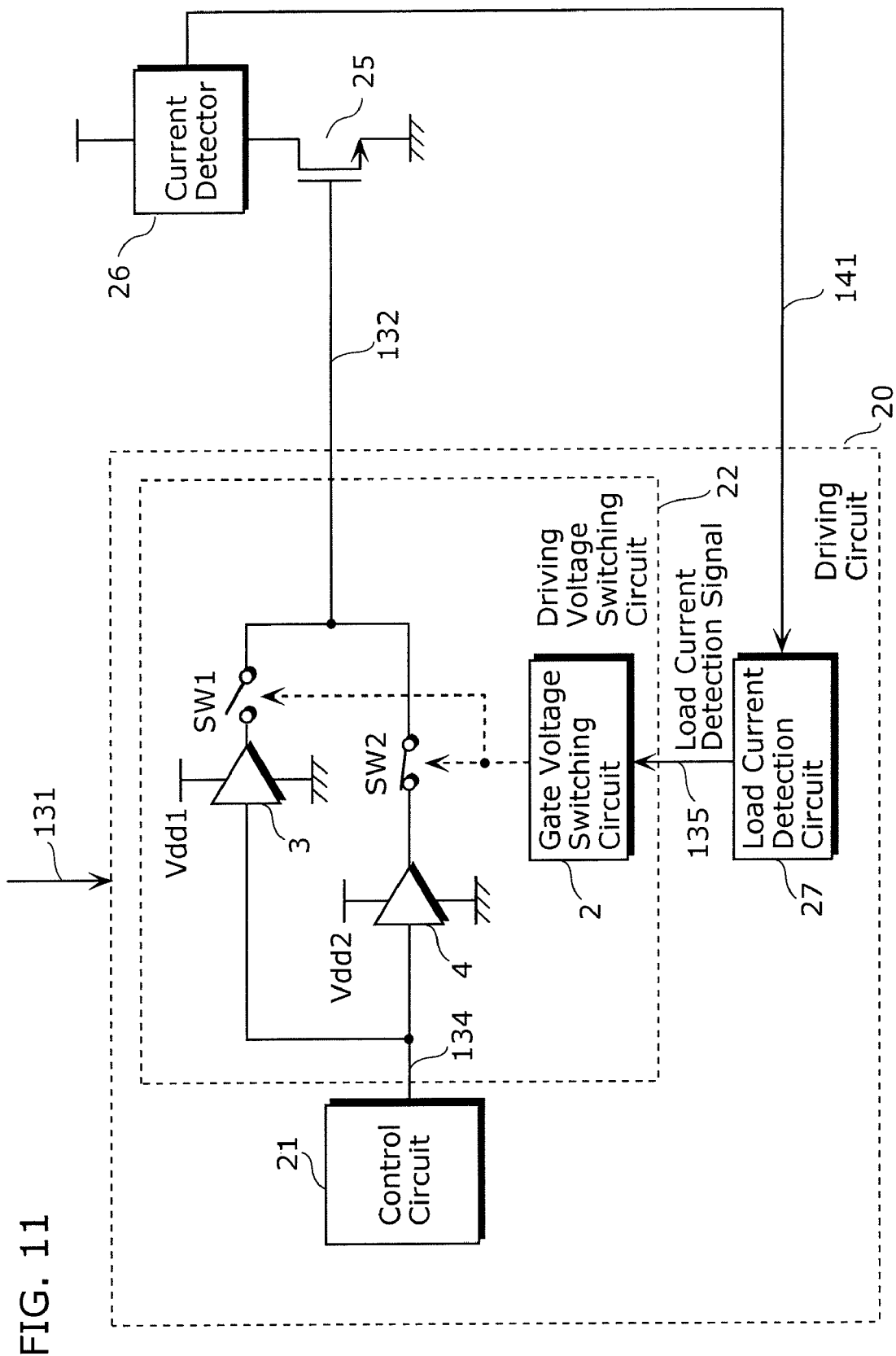
FIG. 11 is a diagram illustrating in detail the configuration which is shown in FIG. 3 and in which the current detector is included instead of the feedback circuit.

Furthermore, the switching power supply apparatus 100 may include a current detector which measures a load current value, for example, instead of the feedback circuit 119, and the load current detection circuit 27 may output the load current detection signal 135 according to the measured load current value. FIG. 10 is a diagram illustrating in detail the configuration which is shown in FIG. 2 and in which a current detector 26 is included instead of the feedback circuit 119. FIG. 11 is a block diagram illustrating in detail the configuration which is shown in FIG. 3 and in which the current detector 26 is included instead of the feedback circuit 119. The current detector 26 is connected to a drain of the voltage control type switching device 25, directly measures a load current value, and outputs, to the load current detection circuit 27, the measured load current value as a load current signal 141. The load current detection circuit 27 compares the outputted load current value and the threshold Idsth, and outputs the load current detection signal 135 to the gate voltage switching circuit 2.

In addition, the driving circuit 20 may detect a change in the voltage control type switching device 25 or other parts in the switching power supply apparatus 100, and switches a gate voltage. For instance, a change in the voltage induced at the auxiliary winding 120 shown in FIG. 1 may be used.

In consideration of temperature characteristics of and variations in manufacturing the voltage control type switching device 25, a threshold at which a gate voltage that is a voltage for driving the voltage control type switching device 25 is switched may be set. Hereafter, in the present Specification, a driving voltage is synonymous with a gate voltage.

When operation states in which a switching power supply apparatus is used for home electronics appliances are, for instance, only two states that are the standby state and the rated load state shown in FIG. 7, timing at which the voltage of the driving signal 132 is switched from the Vdd2 to the Vdd1 hardly affects a power supply efficiency and the like. Thus, in the case where a peak value of a drain current is set to Idsth2 in the rated load state, a threshold may be either a current value flowing through the voltage control type switching device 25 which is larger than the threshold Idsth or a current value which is smaller than the Idsth2. That is to say, the plural levels of voltage at which the power switching device is turned on include the first voltage and the second voltage that is lower than the first voltage. The generation unit includes the first driver which generates the first voltage and the second driver which generates the second voltage. The switching control unit is configured to control the first and second drivers so that the first driver generates, as the driving signal for turning on the power switching device, the pulse having the first voltage, when the load current flowing through the power switching device is larger than the first threshold, and to control the first and second drivers so that the second driver generates, as the driving signal for turning on the power switching device, the pulse having the second voltage, when the load current flowing through the power switching device is equal to or smaller than the second threshold which is smaller than the first threshold.

Although the threshold at which the driving circuit 20 switches the gate voltage is determined based on the gate voltage dependence in the embodiment 1, the load current detection circuit 27 may use, as the threshold, a drain current corresponding to the intersection of the solid line (when the gate voltage is the high gate voltage Vdd1) and the dashed line (when the gate voltage is the low gate voltage Vdd2). That is to say, it is possible to drive the voltage control type switching device 25 at the low gate voltage Vdd2 until the overall loss when the gate voltage is the Vdd2 exceeds the overall loss when the gate voltage is the Vdd1. In addition, the threshold may be intentionally set high or low. In consideration of the ratio between the driving loss caused by the driving circuit 20 and the conduction loss caused by the voltage control type switching device 25, the threshold may be set higher than the threshold Idsth. Moreover, the threshold may be adjusted outside so that the loss in the switching power supply apparatus 100 is reduced optimally.

Although the switching power supply apparatus 100 employing the RCC method as shown in FIG. 1 has been described in the embodiment 1, a switching power supply apparatus to which the driving circuit 20 according to the present invention can be applied is not limited to FIG. 1. For instance, a driving circuit which drives the voltage control type switching device while controlling a width of on pulse of the voltage control type switching device in which an inductive load is series-connected or a peak current may bring about the same advantageous effect with the present invention.

Embodiment 2

A driving circuit according to an embodiment 2 controls a second driver so that the second driver generates, as a driving signal for turning on a voltage control type switching device, a pulse having a second voltage, when a load current is equal to or smaller than a threshold, and controls a first driver which generates a first voltage and the second driver which generates the second voltage that is lower than the first voltage so that either the first driver or the first and second drivers generate, as the driving signal for turning on the voltage control type switching device, a two-stage pulse which rises at the second voltage and further at the first voltage.

It is to be noted that because a configuration of the driving circuit according to the embodiment 2 is the same as in FIG. 2 and a configuration of a switching power supply apparatus including the driving circuit according to the embodiment 2 is the same as in FIG. 1, the configurations described in the embodiment 1 will not be described here again.

Next, an operation of the switching power supply apparatus including the driving circuit according to the embodiment 2 will be described.

Figure 12:
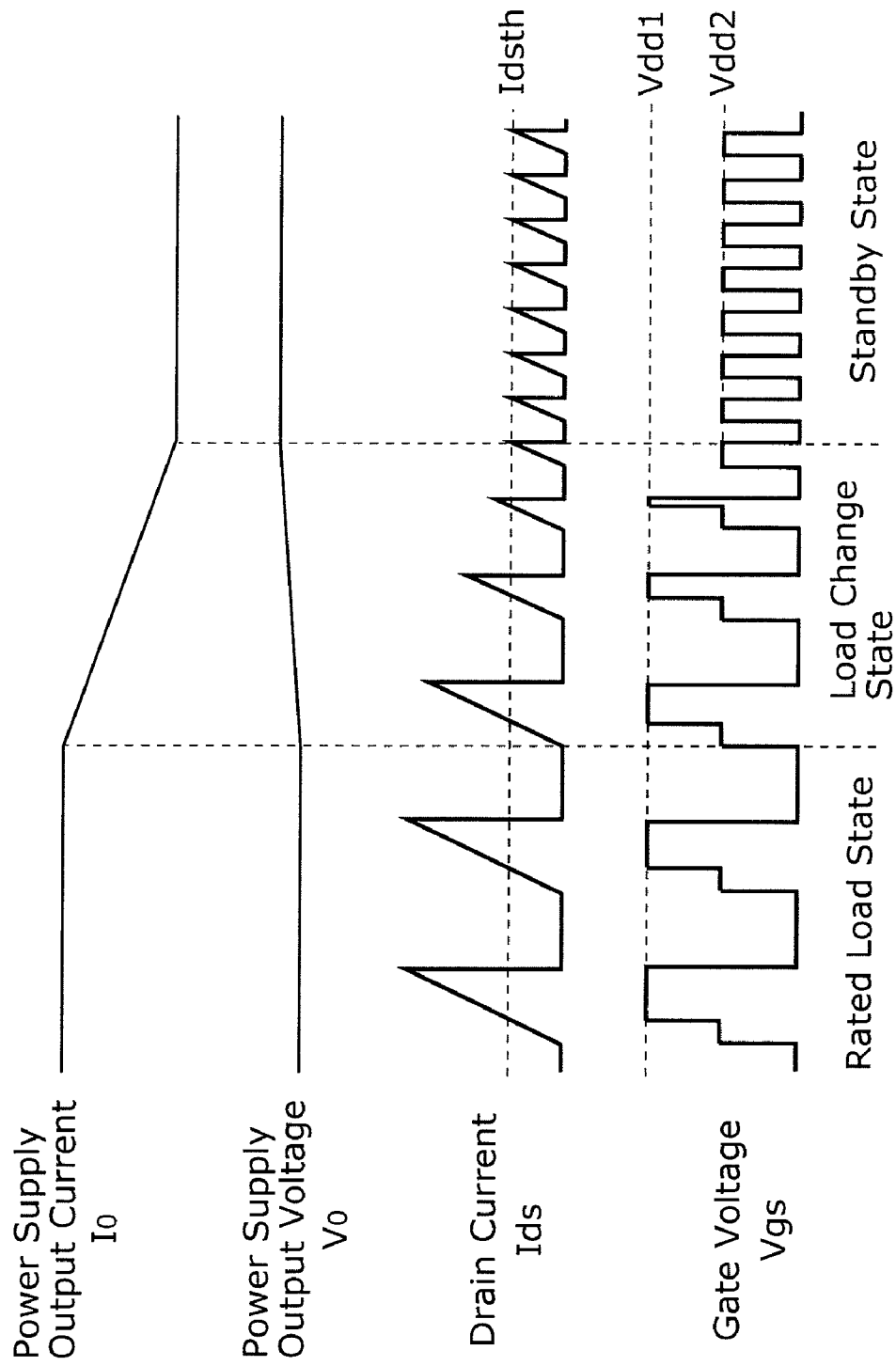
FIG. 12 is a timing diagram illustrating, in different load states, a power supply output current and a power supply output voltage of a switching power supply apparatus including a driving circuit, and a drain current and a gate voltage of a voltage control type switching device according to an embodiment 2.

FIG. 12 is a timing diagram illustrating, in each load state, a power supply output current Io and a power supply output voltage Vo of a switching power supply apparatus 100 including a driving circuit 20 according to the embodiment 2, and a drain current Ids and a gate voltage Vgs of a voltage control type switching device 25. Hereafter, the difference between the driving circuit 20 according to the embodiment 2 and the driving circuit 20 according to the embodiment 1 will be described in detail.

Based on the feedback signal 133, a load current detection circuit 27 according to the embodiment 1 compares the peak current of the drain current Ids flowing through the voltage control type switching device 25 and the predetermined threshold Idsth, and a gate voltage switching circuit 2 selects whether the gate voltage Vgs is the Vdd1 or the Vdd2. In contrast, the load current detection circuit 27 according to the embodiment 2 outputs a load current detection signal 135 so that a gate voltage Vgs first rises to Vdd2, is maintained at the Vdd2 for a certain period, and then rises to Vdd1, when the peak current of a drain current Ids flowing through the voltage control type switching device 25 is larger than threshold Idsth. In the middle of a time period in which a driving signal 132 is on, when the load current detection signal 135 is changed from low to high, the gate voltage switching circuit 2 turns on a first switch SW1 and turns off a second switch SW2, so as to switch the gate voltage Vgs from the Vdd2 to the Vdd1. That is to say, the driving circuit 20 according to the embodiment 2 can set the gate voltage to the low gate voltage Vdd2 right after the driving signal 132 which is on is outputted, and switch from the low gate voltage Vdd2 to the high gate voltage Vdd1 within a high-level period of one pulse of the driving signal 132, as necessary.

Accordingly, right after a control signal 134 rises, a voltage of the driving signal 132 is always the Vdd2. Because a high-frequency component is reduced in comparison to the embodiment 1 in which the gate voltage rises to the high gate voltage Vdd1 in one step when the driving signal 132 is on, noise generation at a time when the driving signal 132 is switched from off to on can be reduced. In addition, as shown in FIGS. 10 and 11, when the current load is measured at the primary side, it is possible to perform more practical control such as detecting that the load current which gradually increases after the voltage control type switching device 25 is turned on exceeds the threshold Idsth and switching the gate voltage Vgs.

Embodiment 3

In addition to the functions described in the embodiment 2, a driving circuit according to an embodiment 3 detects an overcurrent when the overcurrent flows through a voltage control type switching device, stabilizes a gate voltage of a voltage control type switching device to a low gate voltage to limit a current capability of the voltage control type switching device, and prevents the voltage control type switching device from breaking down due to latchup.

Figure 13:
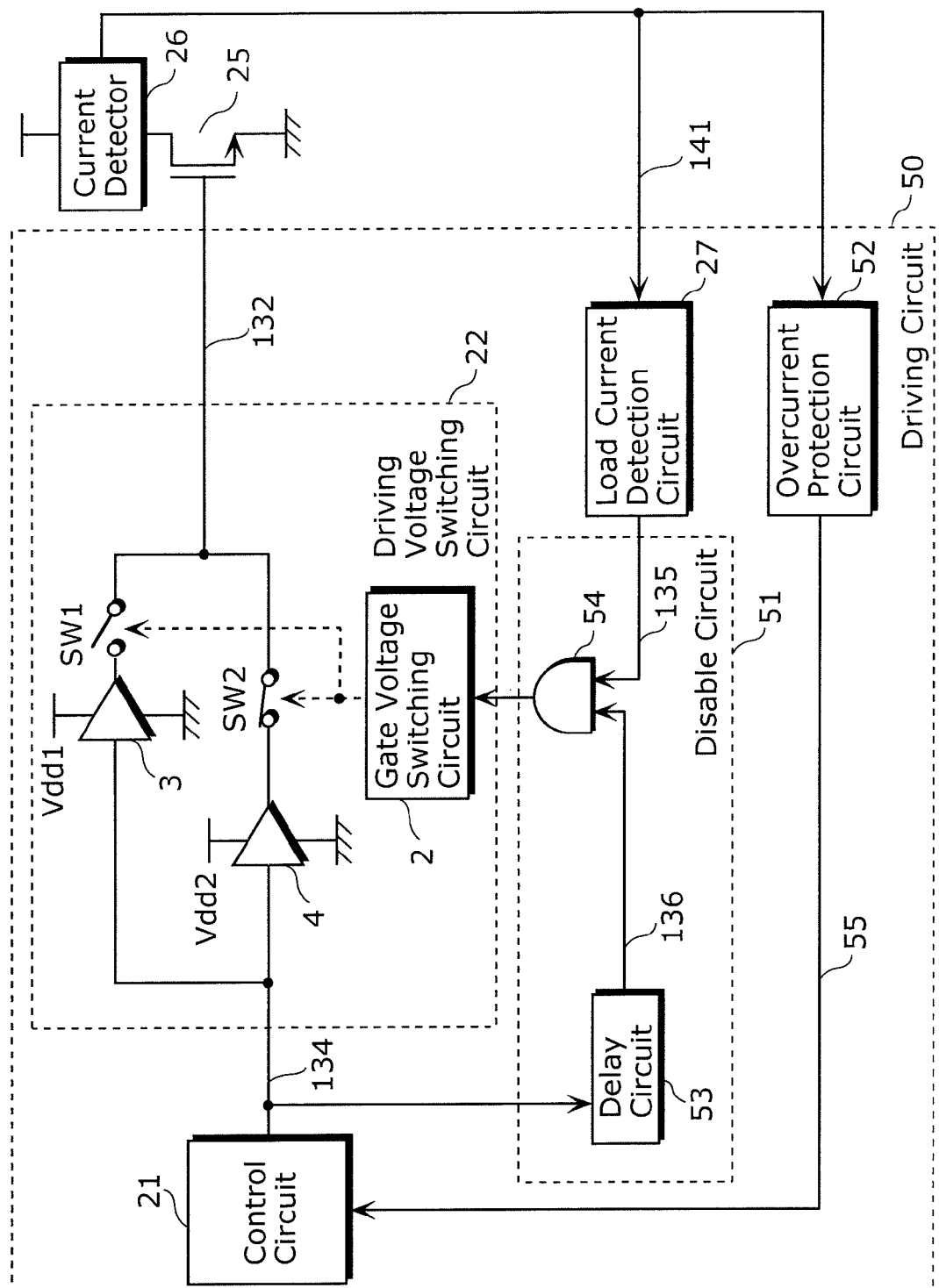
FIG. 13 is a diagram illustrating a configuration of a driving circuit, a voltage control type switching device, and a current detector according to an embodiment 3.

FIG. 13 is a diagram illustrating a configuration of a driving circuit 50, a voltage control type switching device 25, and a current detector 26 according to the embodiment 3. It is to be noted that the same elements of the driving circuit 20 according to the above-mentioned embodiment 2 are represented by the same reference numerals in the figure. Thus, the configuration of the driving circuit 20 according to the embodiment 2 will not be described in the embodiment 3 again. Hereafter, the difference between the driving circuit 50 according to the embodiment 3 and the driving circuit 20 according to the embodiment 1 will be described in detail.

In comparison with the driving circuit 20 according to the embodiment 2 shown in FIG. 11, the driving circuit 50 according to the embodiment 3 further includes a disable circuit 51 and an overcurrent protection circuit 52. The disable circuit 51 disables a high voltage driver 3 for a time period corresponding to a time period from when the overcurrent flowing through the voltage control type switching device 25 is detected until when the driving circuit 50 is suspended. Specifically, the disable circuit 51 includes a delay circuit 53 and an AND gate 54.

The delay circuit 53 delays a control signal 134 outputted by a control circuit 21 by a predetermined delay time Tdelay, and outputs, to the AND gate 54, the control signal 134 as a delay signal 136. Here, it is necessary that the predetermined delay time Tdelay is longer than a time from when the overcurrent protection circuit 52 detects the overcurrent until the driving circuit 50 is suspended.

The AND gate 54 obtains a logical AND between the delay signal 136 outputted by the delay circuit 53 and a load current detection signal 135 outputted by a load current detection circuit 27, and outputs the obtained logical AND to a gate voltage switching circuit 2. Thus, unlike the embodiment 2, the gate voltage switching circuit 2 does not switch between a first switch SW1 and a second switch SW2 for a time period in which the delay signal 136 is low, even in the case where the load current detection circuit 27 detects that a drain current Ids flowing through the voltage control type switching device 25 exceeds threshold Idsth and the load current detection signal 135 is set high.

The overcurrent protection circuit 52 includes, for instance, a comparator, judges whether or not the drain current Ids which is measured by the current detector 26 and flows through the voltage control type switching device 25 exceeds a predetermined threshold Idsoc which is larger than the threshold Idsth and indicates an overcurrent reference, and outputs, to the control circuit 21, an overcurrent detection signal 55 which indicates a result of the judgment. For example, the overcurrent protection K circuit 52 sets the overcurrent detection signal 55 high in the case where the drain current Ids exceeds the threshold Idsoc, and sets the overcurrent detection signal 55 low in the case where the current drain Ids is equal to or smaller than the threshold Idsoc. The control circuit 21 performs the same control as in the embodiment 2 in the case where the overcurrent detection signal 55 is low. In addition, the control circuit 21 sets the control signal 134 low and suspends the driving circuit 50 in the case where the overcurrent detection signal 55 is high. As a result, in the case where the overcurrent is detected, the voltage control type switching device 25 is turned off.

Next, the operation of the driving circuit 50 according to the embodiment 3 will be described.

Figure 14:
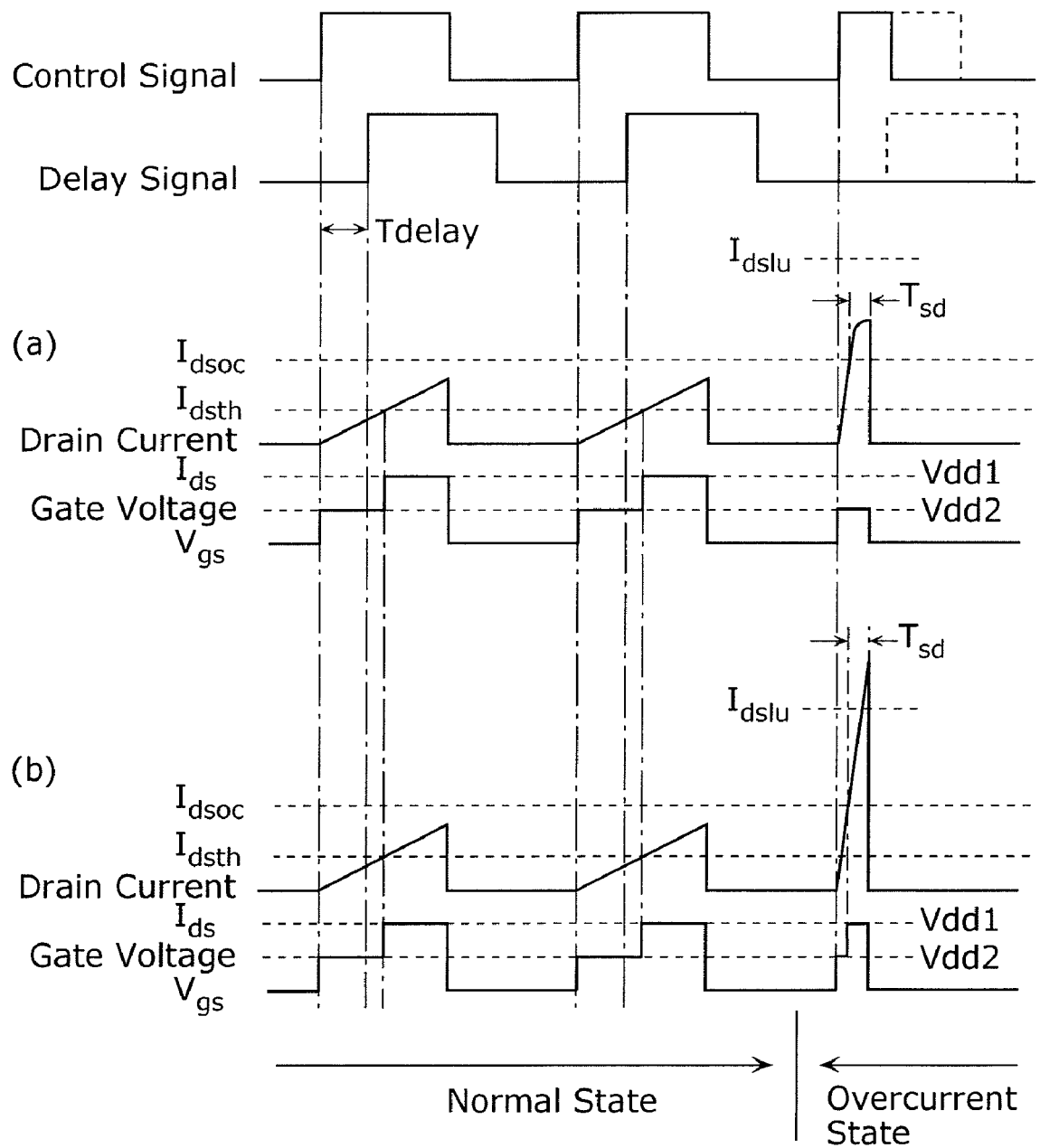
FIG. 14 is a timing diagram illustrating operations of the driving circuit according to the embodiment 3 in a normal state and an overcurrent state.

FIG. 14 is a timing diagram illustrating operations of the driving circuit 50 according to the embodiment 3 in a normal state and an overcurrent state.

Case (a) indicates a drain current Ids and a gate voltage Vgs in the case where the driving circuit 50 includes the delay circuit 53, and case (b) indicates a drain current Ids and a gate voltage Vgs in the case where the driving circuit 50 does not include the delay circuit 53. A delay signal 136 is a signal delayed from a control signal 134 by a delay time Tdelay. Tsd is a time from when the overcurrent protection circuit 52 detects the overcurrent until when the control circuit 21 sets the control signal 134 low and suspends the driving circuit 50. Idslu is a drain current value at which the voltage control type switching device 25 breaks down due to latchup. The normal state is any of the rated load state, the load change state, and the standby state described in the embodiment 2. The overcurrent state is a state in which a short circuit occurs and a large current flows at an output side of an switching power supply apparatus 100.

As with the embodiment 2, under the normal state, in the cases (a) and (b), when the control signal 134 is turned on, the driving voltage switching circuit 22 outputs, the driving signal 132, a pulse of the Vdd2 having a high gate voltage. With this, the drain current Ids gradually increases. The delay signal 136 is turned on later by the delay time Tdelay from the time when the control signal 134 is turned on. Next, when the drain current Ids exceeds the threshold Idsth, because the gate voltage switching circuit 2 turns on the first switch SW1 and turns off the second switch SW2 in the case where the delay signal 136 is at a high level, the gate voltage Vgs is the Vdd1.

Under the overcurrent state, the drain current Ids rapidly increases. At this time, in the case (a), in the case where the delay signal 136 is low even when the drain current Ids exceeds the threshold Idsth, an output of the AND gate 54 is low, and the gate voltage switching circuit 2 does not switch between the first switch SW1 and the second switch SW2. Consequently, the driving signal 132 remains the pulse signal of the Vdd2 having the high gate voltage level. That is to say, the gate voltage Vgs is always equal to or smaller than the Vdd2 for the delay time Tdelay since the control signal 134 has been turned on.

On the other hand, in the case (b), because the driving circuit 50 does not include the delay circuit 53, when the drain current Ids exceeds the threshold Idsth, the gate voltage switching circuit 2 turns on the first switch SW1 and turns off the second switch SW2. Thus, the voltage of the driving signal 132 rises from the Vdd2 to the Vdd1.

Because the maximum value of the drain current Ids increases with the rise in the gate voltage Vgs, when the maximum values of the drain current Ids under the overcurrent state in the cases (a) and (b) are compared, the maximum value of the drain current Ids in the case (a) in which the gate voltage Vgs is lower is smaller than the maximum value of the drain current Ids in the case (b).

Accordingly, for instance, in the case where the Idslu is in between the maximum value of the drain current Ids flowing when the gate voltage Vgs is the Vdd2 and the maximum value of the drain current Ids flowing when the gate voltage Vgs is the Vdd1, the following happens. In the case (b), because the drain current Ids further exceeds the Idslu after exceeding the threshold Idsoc that is a reference indicating the overcurrent, the overcurrent keeps flowing, and the voltage control type switching device 25 breaks down due to the latchup. In the case (a), however, the drain current Ids does not exceed the Idslu because the gate voltage Vgs is the Vdd2. Because the driving circuit 50 is suspended when the control signal 134 is low after the passage of a time Tsd since the drain current Ids has exceeded the threshold Idsoc, the voltage control type switching device 25 does not break down due to the latchup.

As described above, the driving circuit 50 according to the embodiment 3 sets the gate voltage Vgs to the low gate voltage up to the time Tsd from when the overcurrent protection circuit 52 detects the overcurrent until when the control circuit 21 sets the control signal 134 low, so as to suppress the current capability of the voltage control type switching device 25. As a result, it is possible to limit the large current that flows at the occurrence of abnormality such as the load short. That is to say, the breakdown of the voltage control type switching device caused by the flow of the large current can be prevented. In particular, a switching device having a parasitic thyristor structure such as the IGBT prevents the latchup, thereby avoiding breakdown in an effective manner.

The threshold Idsoc that is the reference indicating the overcurrent is a drain current value corresponding to an overcurrent protection reference voltage VLIMIT or a current value at which a drain current flowing through the voltage control type switching device 25 is determined by a feedback signal from a feedback circuit 119. It is to be noted that the overcurrent protection circuit 52 generally has a delay time from when the voltage control type switching device 25 is turned on until when the voltage control type switching device 25 starts an operation.

Although the load short is exemplified as an overcurrent protection operation, there are same effects for an inrush current at the startup of a power supply switching apparatus.

Embodiment 4

Although a driving circuit according to an embodiment 4 is almost the same as the driving circuit 20 according to the embodiment 2, the driving circuit according to the embodiment 4 differs from the driving circuit 20 according to the embodiment 2 in including a current limiting unit configured to limit a power supply current supplied to a high voltage driver.

Figure 15:
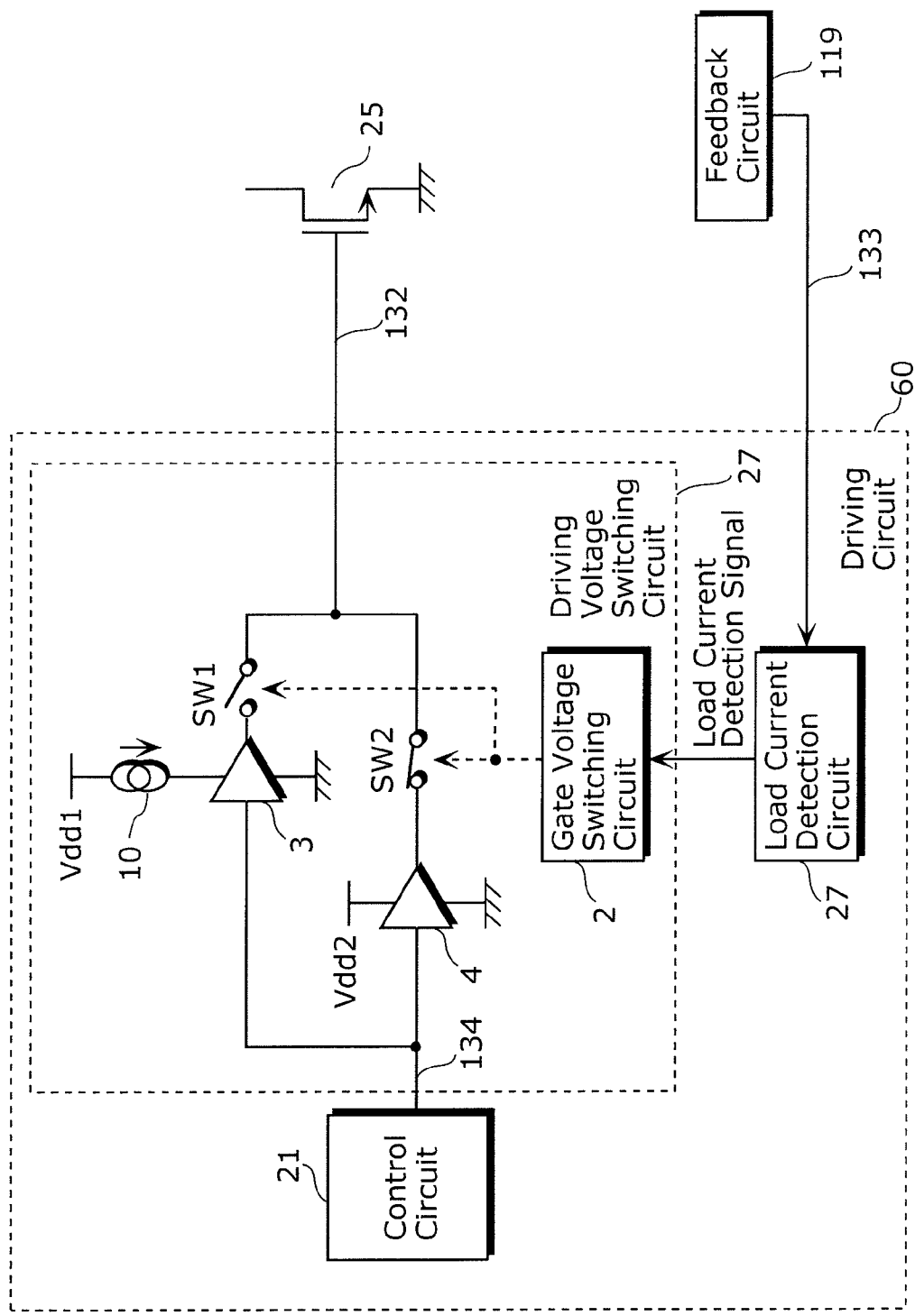
FIG. 15 is a diagram illustrating a configuration of a driving circuit, a voltage control type switching device, and a feedback circuit according to an embodiment 4.

FIG. 15 is a diagram illustrating a configuration of a driving circuit 60, a voltage control type switching device 25, and a feedback circuit 119 according to the embodiment 4. It is to be noted that the same elements of the driving circuit 20 according to the above-mentioned embodiment 2 are represented by the same reference numerals in the figure. Thus, the configuration of the driving circuit 20 according to the embodiment 2 will not be described in the embodiment 3 again. Hereafter, the difference between the driving circuit 60 according to the embodiment 4 and the driving circuit 20 according to the embodiment 1 will be described in detail.

In comparison with the driving circuit 20 according to the embodiment 2, the driving circuit 60 according to the embodiment 4 further includes a constant current circuit 10. The constant current circuit 10 is a circuit which limits the power supply current supplied to a high voltage driver 3. Accordingly, an edge of a driving signal 132 at a time when a voltage level of the driving signal 132 rises to Vdd1 can be dulled.

Figure 16:
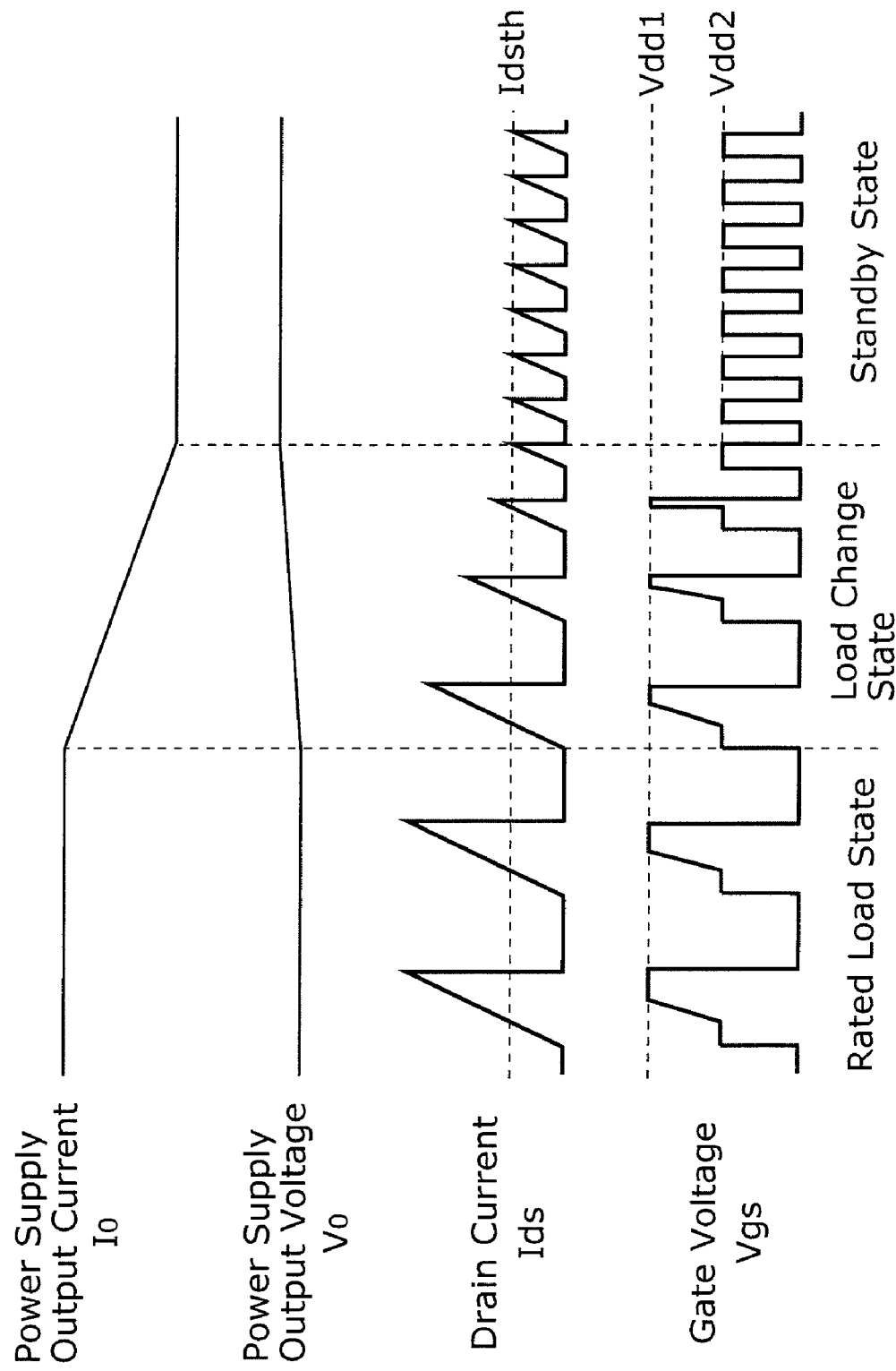
FIG. 16 is a timing diagram illustrating, in different load states, a power supply output current and a power supply output voltage of a switching power supply apparatus, and a drain current and a gate voltage of a voltage control type switching device according to the embodiment 4.

FIG. 16 is a timing diagram illustrating, in different load states, a power supply output current Io and a power supply output voltage Vo of a switching power supply apparatus, and a drain current and a gate voltage of the voltage control type switching device 25 according to the embodiment 4.

In the driving circuit 60 according to the embodiment 4, when a load current detection signal 135 is set high within a time period in which a control signal 134 is on, a gate voltage switching circuit 2 controls a first switch SW1 and a second switch SW2 to switch a gate voltage Vgs from Vdd2 to Vdd1. At this time, because the constant current circuit 10 is connected to the high voltage driver 3, a gate charging current is limited, and rising an edge of the gate voltage Vgs to the Vdd1 is suppressed.

As described above, because the driving circuit 60 according to the embodiment 4 delays voltage rise speed at a time when the gate voltage is switched and reduces a high-frequency component by limiting the gate charging current at a high gate voltage side, the driving circuit 60 according to the embodiment 4 can suppress the occurrence of noise.

It is to be noted that the configuration of the driving circuit according to the present invention is not limited to FIG. 15 illustrating the embodiment 4. Although the constant current circuit 10 is connected to the high voltage driver 3 in the embodiment 4, the gate charging current may be limited, for example, by connecting a gate resistor between the high voltage driver 3 and the first switch SW1. Furthermore, the gate charging current may be limited by connecting the gate resistor between a low voltage driver 4 and the second switch SW2. Moreover, the constant current circuit 10 may be connected to the low voltage driver 4, or to both the low voltage driver 4 and the high voltage driver 3.

Figure 17:
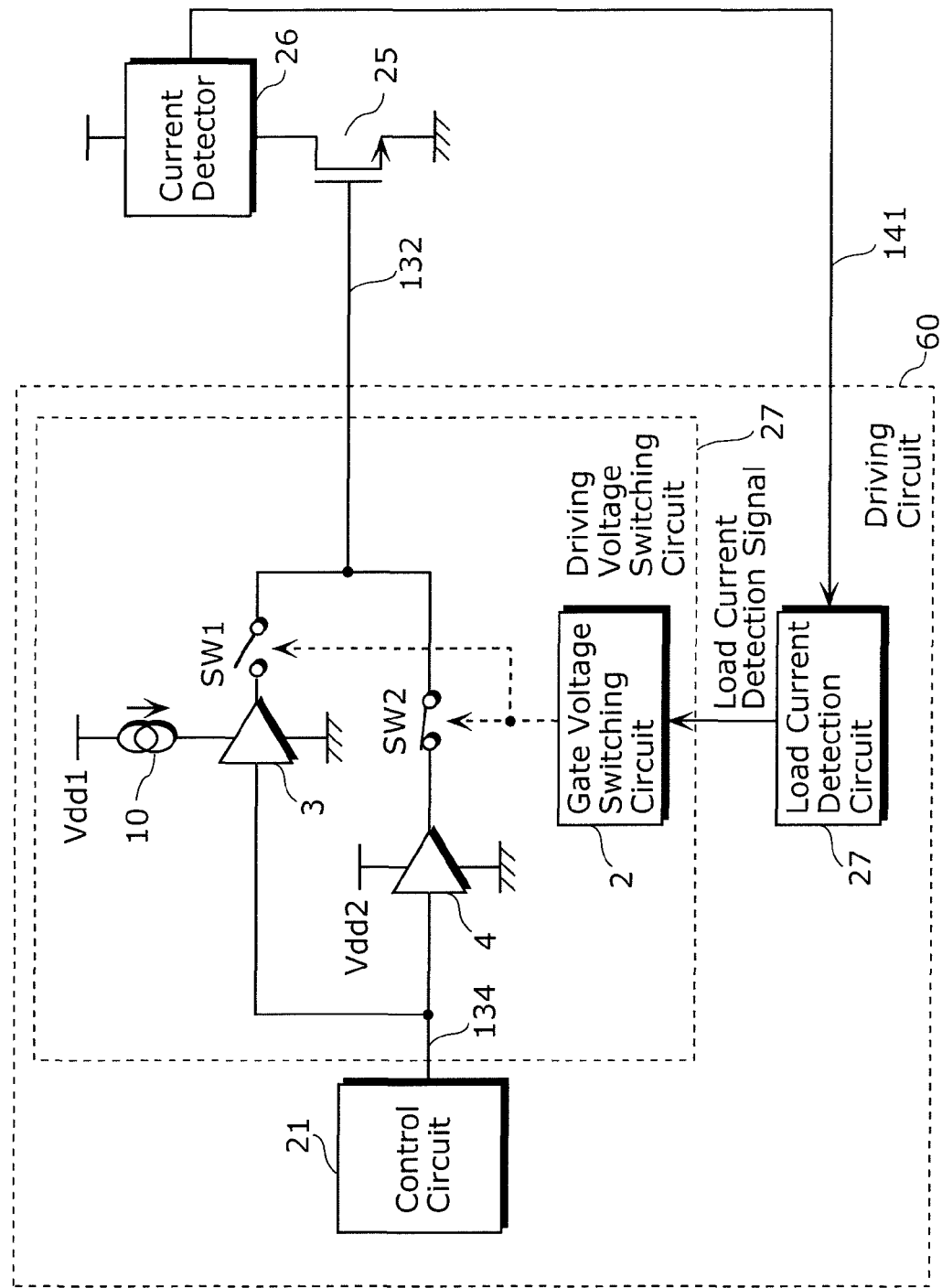
FIG. 17 is a diagram illustrating the configuration which is shown in FIG. 15 and in which a current detector is included instead of the feedback circuit of the embodiment 4.

Furthermore, a switching power supply apparatus may include, for example, instead of the feedback circuit 119, a current detector which measures a load current value, and a load current detection circuit 27 may output a load current detection signal 135 according to the measured load current value. FIG. 17 is a diagram illustrating in detail the configuration which is shown in FIG. 15 and in which the current detector 26 is included instead of the feedback circuit 119 of the embodiment 4.

Embodiment 5

A driving circuit according to an embodiment 5 controls a low voltage driver 4 so that the low voltage driver 4 generates, as a driving signal for turning on a switching power supply apparatus, a pulse of Vdd1 having a high gate voltage level, when a load current is equal to or lower than a threshold, and further controls a high voltage driver 3 so that the high voltage driver 3 generates, as the driving signal for turning on the switching power supply apparatus, a pulse of the Vdd1 having the high gate voltage level, when the load current is higher than the threshold.

Figure 18:
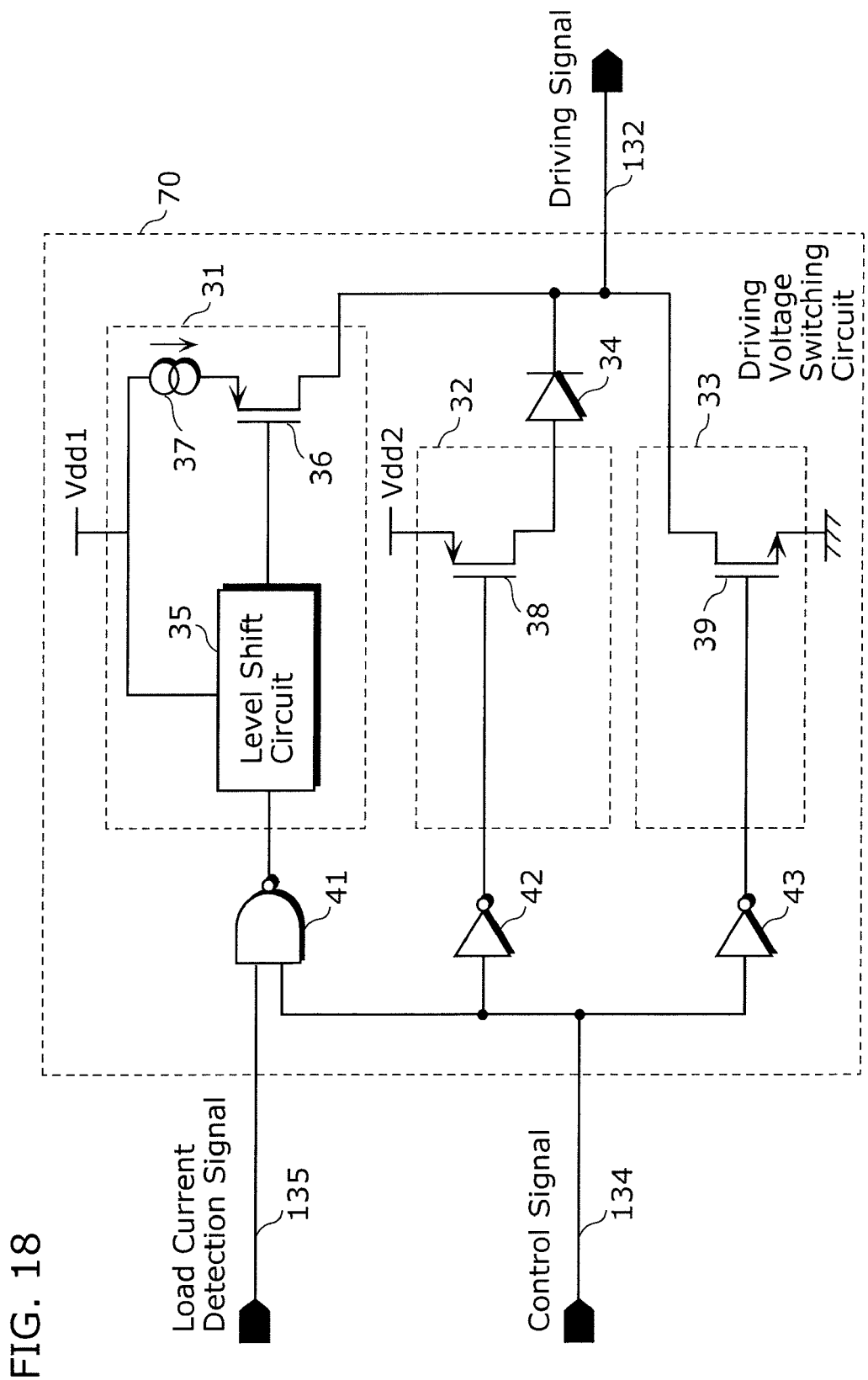
FIG. 18 is a circuit diagram of a driving voltage switching circuit included in a driving circuit according to an embodiment 5.
Figure 19:
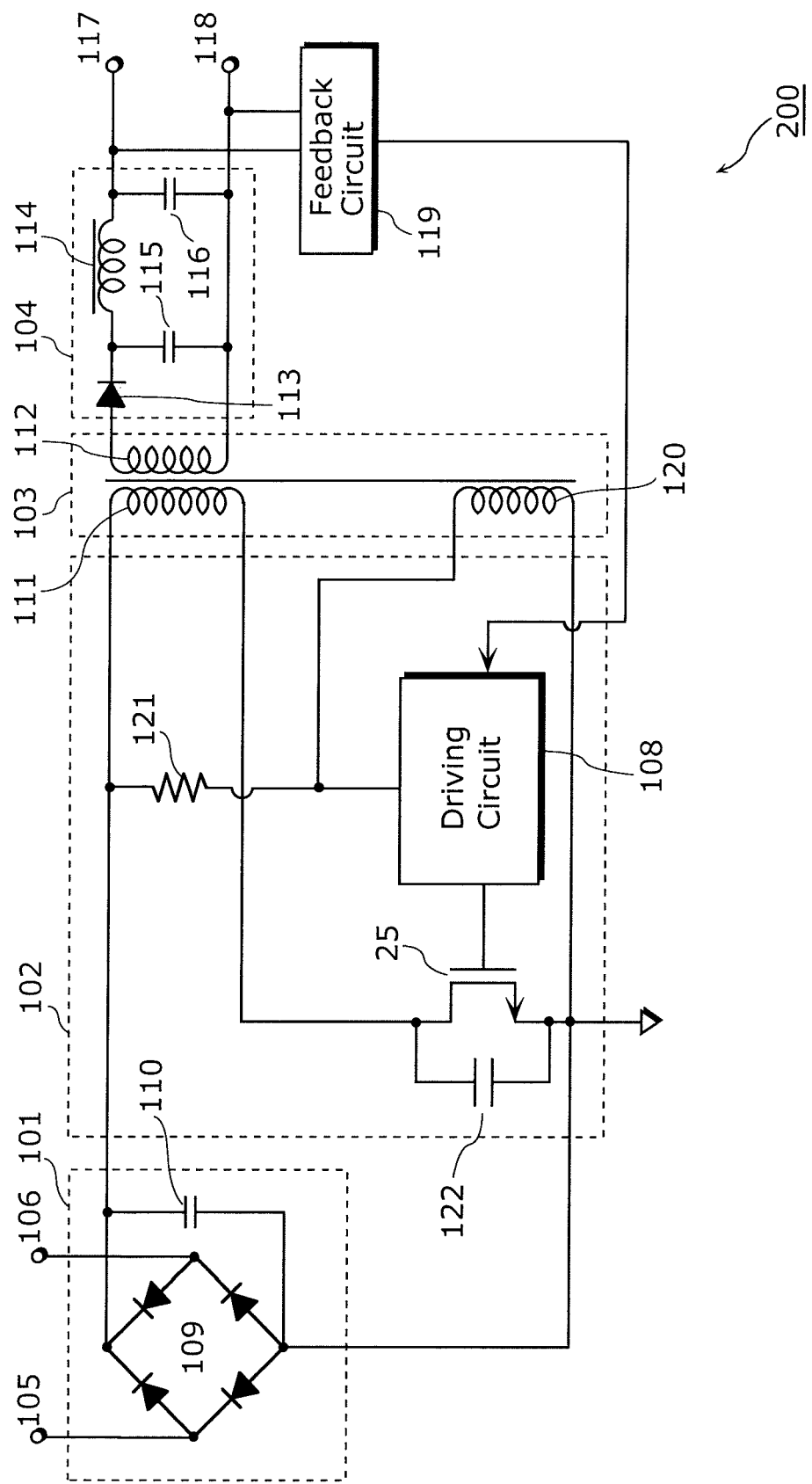
FIG. 19 is a diagram illustrating an example of a conventional configuration of a switching power supply apparatus.
Figure 20:
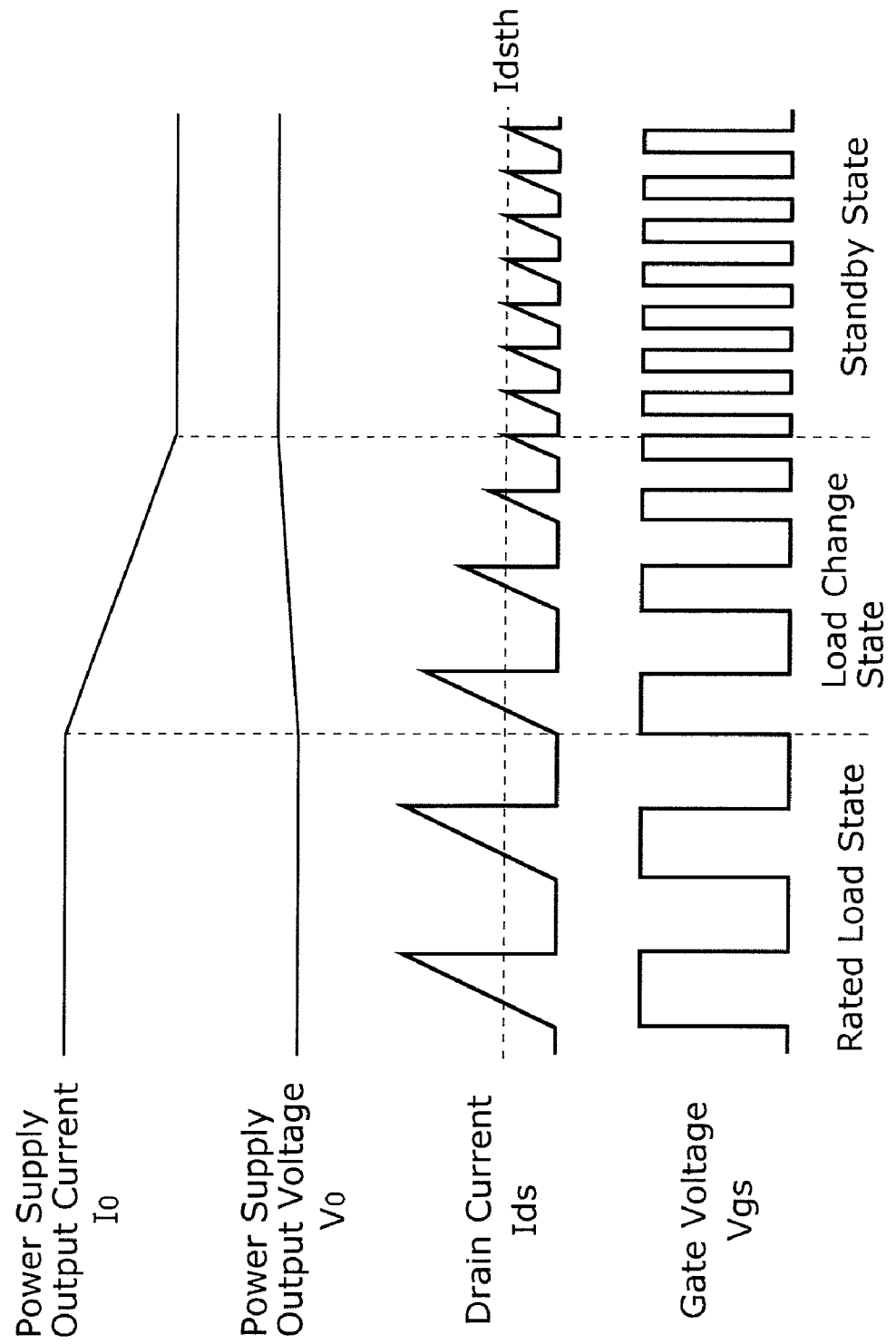
FIG. 20 is a timing diagram illustrating, in different load states, a power supply output current and a power supply output voltage of the conventional switching power supply apparatus, and a drain current and a gate voltage of a voltage control type switching device.

FIG. 18 is a circuit diagram of a driving voltage switching circuit 70 included in a driving circuit according to the embodiment 5. It is to be noted that the configuration is the same as the respective configurations of the driving circuit 20 according to the embodiments 1 and 2 and the driving circuit 60 according to the embodiment 4, except the driving voltage switching circuit included in the driving circuit.

A driving voltage switching circuit 70 includes a NAND circuit 41, inverter circuits 42 and 43, a high voltage applying circuit 31, a low voltage applying circuit 32, a turn-off circuit 33, and a reverse-flow prevention diode 34.

The NAND circuit 41 outputs, to the high voltage applying circuit 31, a negative logical AND between a load current detection signal 135 and a control signal 134. Consequently, when the load current detection signal 135 and the control signal 134 are set high, the high voltage applying circuit 31 is driven.

The inverter circuit 42 outputs an inversion signal of the control signal 134 to a p-channel MOSFET 38, and the inverter circuit 43 outputs an inversion signal of the control signal 134 to an n-channel MOSFET 39.

The high voltage applying circuit 31 functions as a first driver, and includes a level shift circuit 35, a p-channel MOSFET 36, and a constant current circuit 37.

The level shift circuit 35 converts logic active at Vdd2 into logic active at Vdd1. As a result, the p-channel MOSFET 36 in a subsequent stage can be turned off completely. The level shift circuit 35 may be a common circuit which converts a low voltage signal into a high voltage signal.

The Vdd1 is applied to a source of the p-channel MOSFET 36 via the constant current circuit 37, and a signal which the level shift circuit 35 converted into the logic active at the Vdd1 is inputted to a gate of the p-channel MOSFET 36.

The constant current circuit 37 limits a power supply current to be supplied to the p-channel MOSFET 36.

Thus, the p-channel MOSFET is turned on when the load current detection signal 135 and the control signal 134 are set high, respectively, and the high voltage applying circuit 31 outputs the Vdd1. Furthermore, rising an edge of a driving signal 132 to the Vdd1 is mildly-sloped.

The low voltage applying circuit 32 functions as a second driver, and includes the p-channel MOSFET 38. The Vdd2 is applied to a source of the p-channel MOSFET 38, and the control signal 134 which is inverted by the inverter circuit 42 is inputted to a gate of the p-channel MOSFET 38. Thus, the p-channel MOSFET 38 is turned on in a time period in which the control signal 134 is set high, and the low voltage applying circuit 32 outputs the Vdd2.

The turn-off circuit 33 includes the n-channel MOSFET 39. A source of the n-channel MOSFET 39 is grounded, and the control signal 134 which is inverted by the inverter circuit 43 is inputted to a gate of the n-channel MOSFET 39. Thus, the n-channel MOSFET 39 is turned on in a time period in which the control signal 134 is set low, and the turn-off circuit 33 outputs a ground level.

The reverse-flow prevention diode 34 is connected between a drain of the p-channel MOSFET 36 and a drain of the p-channel MOSFET 38. Thus, when the load current detection signal 135 and the control signal 134 are set high, that is, in a time period in which the p-channel MOSFET 36 and the p-channel MOSFET 38 are turned on, the reverse-flow prevention diode 34 prevents reverse flow of a current from the high voltage applying circuit 31 to the low voltage applying circuit 32.

Next, the operation of the driving voltage switching circuit 70 according to the embodiment 5 will be described. It is to be noted that a timing diagram to be described in the embodiment 5 is the same as the timing diagram in FIG. 16 described in the embodiment 4.

When the control circuit 21 inputs, to the driving voltage switching circuit 70, the control signal 134 that is set high, on the one hand the inverter circuit 43 turns off the n-channel MOSFET 39 in the turn-off circuit 33, but on the other hand the inverter circuit 42 turns on the p-channel MOSFET 38 in the low voltage applying circuit 32. Then, a low power supply voltage Vdd2 is supplied, as a driving voltage of the voltage control type switching device 25, via the reverse-flow prevention diode 34 to turn on the voltage control type switching device 25. After the voltage control type switching device 25 is turned on, a current flowing through the voltage control type switching device 25 keeps increasing. When the current exceeds a threshold Idsth, the load current detection circuit 27 turns on the load current detection signal 135, and an output of the NAND circuit 41 is inverted. A signal outputted by the level shift circuit 35 performs on and off control of the p-channel MOSFET 36. That is to say, when the current flowing through the voltage control type switching device 25 exceeds the threshold Idsth, the Vdd1 is supplied, as the driving voltage of the voltage control type switching device 25, and the driving signal 132 that is set high is switched from the Vdd2 to the Vdd1.

Because the reverse-flow prevention diode 34 is inserted between the high voltage applying circuit 31 and the low voltage applying circuit 32, the current does not reversely flow into the low voltage applying circuit 32. Moreover, because the constant current circuit 37 is connected to the source of the p-channel MOSFET 36 in the high voltage applying circuit 31 and a gate charging current for switching the driving voltage is supplied at constant amount, rising the edge of the driving signal 132 to the Vdd1 becomes gradual.

As described above, the load current detection circuit 27 and the NAND circuit 41 generate a pulse for enabling an output of the high voltage applying circuit 31, when the load current is higher than the threshold Idsth. The high voltage applying circuit 31 includes the p-channel MOSFET 36 having the source to which the Vdd1 is applied and the gate to which the pulse signal of the logical AND between the load current detection signal 135 and the control signal 134 is applied. The low voltage applying circuit 32 includes the p-channel MOSFET 38 having the source to which the Vdd2 is applied and the gate to which the control signal indicating a time period when the voltage control type switching device 25 is turned on and a time period when the voltage control type switching 25 is turned off is applied. The driving voltage switching circuit 70 includes the reverse-flow prevention diode 34 which prevents the reverse flow of the current and is connected between the respective drains of the p-channel MOSFETS 36 and 38, and the n-channel MOSFET 39 which turns on and off the voltage control type switching device 25 in a complementary manner with the p-channel MOSFET 38, and applies the drain voltage of the p-channel MOSFET 38 as the driving signal 132 to the voltage control type switching device 25.

Accordingly, the driving voltage switching circuit 70 according to the embodiment 5 can be easily configured using the MOSFET.

Although the embodiments have been described above, the present invention is not limited to the embodiments. Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

For example, the load current detection circuit 27 may output an analog signal according to a load current, and the driving voltage switching circuit 22 and the control circuit 21 may perform signal processing on the analog signal therein.

Although the load current is detected from the high voltage side of the voltage control type switching device 25 in FIGS. 10, 11, 13 and 17, a resistor may be inserted at the low voltage side, and an I-V converted signal may be inputted to the load current detection circuit 27.

INDUSTRIAL APPLICABILITY

The present invention is a driving circuit which drives a power switching device in a switching power supply apparatus, and is suitable for the switching power supply apparatus used in liquid crystal display televisions, plasma televisions, DVD recorders, and so on.

What is claimed is:
1. A driving circuit, comprising:
a generation unit configured to generate a driving signal for turning on and off a power switching device, the driving signal having plural levels of voltage at which the power switching device is turned on; and
a switching control unit configured to switch between the plural levels of voltage at which the power switching device is turned on, depending on a status of the power switching device.

2. The driving circuit according to claim 1,
wherein said switching control unit is configured to switch between the plural levels of voltage so that voltage increases with a higher load current flowing through the power switching device.

3. The driving circuit according to claim 1,
wherein the plural levels of voltage include a first voltage and a second voltage that is lower than the first voltage,
said generation unit includes a first driver which generates the first voltage and a second driver which generates the second voltage, and
said switching control unit is configured to control said first and second drivers so that said second driver generates, as the driving signal for turning on the power switching device, a pulse having the second voltage, when a load current is equal to or smaller than a first threshold, and to control said first and second drivers so that said first driver generates, as the driving signal for turning on the power switching device, a pulse having the first voltage, when the load current is larger than the first threshold.

4. The driving circuit according to claim 3,
wherein said generation unit further includes a current limiting unit configured to limit a power supply current supplied to at least one of said first driver and said second driver.

5. The driving circuit according to claim 4, further comprising:
an overcurrent protection circuit which detects whether or not the load current exceeds a second threshold that is larger than the first threshold and indicates an overcurrent reference, and suspends said driving circuit when said overcurrent protection circuit has detected that the load current exceeds the second threshold; and
a disable circuit which disables said first driver for a time period corresponding to a time period from when an overcurrent is detected until when the power switching device is suspended.

6. The driving circuit according to claim 5,
wherein said switching control unit is configured to generate a first control pulse signal for enabling an output of said first driver when the load current is larger than the first threshold,
said second driver generates the pulse having the second voltage according to a second control pulse signal indicating a time period in which the power switching device is turned on and a time period in which the power switching device is turned off, and
said disable circuit includes:
a delay circuit which delays the second control pulse signal by a predetermined time; and
a gate circuit which outputs, to said first driver, a logical AND between the delayed second control pulse signal and the first control pulse signal.

7. The driving circuit according to claim 3,
wherein said switching control unit is configured to control said second driver so that said second driver generates, as the driving signal for turning on the power switching device, the pulse having the second voltage, when the load current is equal to or smaller than the first threshold, and to control said first and second drivers so that said first driver generates, as the driving signal for turning on the power switching device, a two-step pulse which rises to the second voltage and further to the first voltage, when the load current is larger than the first threshold.

8. The driving circuit according to claim 7,
wherein said generation unit further includes a current limiting unit configured to limit a power supply current supplied to at least one of said first driver and said second driver.

9. The driving circuit according to claim 3,
wherein said switching control unit is configured to generate a first control pulse signal for enabling an output of said first driver when the load current is larger than the first threshold,
said first driver includes a first transistor having a source to which the first voltage is applied and a gate to which a pulse signal of a logical AND between the first control pulse signal and a second control pulse signal is applied,
said second driver includes a second transistor having a source to which the second voltage is applied and a gate to which the second control pulse signal indicating a time period in which the power switching device is turned on and a time period in which the power switching device is turned off,
said generation unit further includes:
a reverse-flow prevention diode which prevents reverse flow of a current, said reverse-flow prevention diode being connected between a drain of said first transistor and a drain of said second transistor; and
a third transistor which turns on and off the power switching device in a complementary manner with said second transistor, and
the drain of said first transistor, a cathode of said reverse-flow prevention diode, and a drain of said third transistor are connected to each other.

10. A driving method for driving a power switching device in a switching power supply apparatus, said driving method comprising:
comparing a load current flowing through the power switching device and a threshold;
outputting, as an ON signal, a pulse having a first voltage at which the power switching device is turned on, when the load current is larger than the threshold; and
outputting, as an ON signal, a pulse having a second voltage that is lower than the first voltage and at which the power switching device is turned on to, when the load current is equal to or smaller than the threshold.

11. A switching power supply apparatus, comprising:
a power switching device which switches voltage of an input signal;
a driving circuit which drives said power switching device;
a transformer which transforms voltage generated by driving said power switching device into a different voltage; and
a rectifying and smoothing circuit which rectifies and smoothes the transformed different voltage and outputs the rectified and smoothed voltage,
wherein said driving circuit includes:
a generation unit configured to generate a driving signal for turning on and off said power switching device, the driving signal having plural levels of voltage at which said power switching device is turned on; and
a switching control unit configured to switch between the plural levels of voltage at which said power switching device is turned on, depending on a status of said power switching device.

12. The switching power supply apparatus according to claim 11,
wherein said power switching device is a unipolar transistor.

13. The switching power supply apparatus according to claim 11,
wherein said power switching device is a transistor having a function to switch between a unipolar operation and a bipolar operation according to a load current flowing through said power switching device.

14. The switching power supply apparatus according to claim 11, further comprising:
a measuring unit configured to measure a current outputted from said rectifying and smoothing circuit; and
a conversion unit configured to convert the measured current into a load current flowing through said power switching device,
wherein said switching control unit is configured to switch between the plural levels of voltage at which said power switching device is turned on, according to the converted load current.

* * * * *

UNITED STATES PATENT AND TRADEMARK OFFICE
CERTIFICATE OF CORRECTION

| | | |
|---|---|---|
| PATENT NO. | : 8,031,496 B2 | Page 1 of 1 |
| APPLICATION NO. | : 12/265217 | |
| DATED | : October 4, 2011 | |
| INVENTOR(S) | : Takashi Saji | |

It is certified that error appears in the above-identified patent and that said Letters Patent is hereby corrected as shown below:

At column 26, line 1, please delete "to" after on.

Signed and Sealed this

Thirty-first Day of January, 2012

David J. Kappos
*Director of the United States Patent and Trademark Office*